(12) United States Patent  
Kim et al.

(10) Patent No.: US 9,173,231 B2  
(45) Date of Patent: Oct. 27, 2015

(54) METHOD FOR TRANSMITTING/RECEIVING DATA IN WIRELESS ACCESS SYSTEM, AND BASE STATION AND USER EQUIPMENT FOR SAME

(75) Inventors: Jinmin Kim, Anyang-si (KR); Seunghee Han, Anyang-si (KR); Hyunwoo Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 117 days.

(21) Appl. No.: 14/111,731

(22) PCT Filed: May 14, 2012

(86) PCT No.: PCT/KR2012/003762  
§ 371 (c)(1),  
(2), (4) Date: Oct. 14, 2013

(87) PCT Pub. No.: WO2012/154014  
PCT Pub. Date: Nov. 15, 2012

(65) Prior Publication Data  
US 2014/0029565 A1    Jan. 30, 2014

Related U.S. Application Data

(60) Provisional application No. 61/485,573, filed on May 12, 2011.

(51) Int. Cl.  
*H04W 72/12* (2009.01)  
*H04L 5/00* (2006.01)  
*H04W 72/04* (2009.01)

(52) U.S. Cl.  
CPC .......... *H04W 72/1294* (2013.01); *H04L 5/001* (2013.01); *H04L 5/0035* (2013.01);

(Continued)

(58) Field of Classification Search  
None  
See application file for complete search history.

(56) References Cited

U.S. PATENT DOCUMENTS

| 2011/0105050 | A1* | 5/2011 | Khandekar et al. ............. 455/68 |
| 2012/0063321 | A1* | 3/2012 | Chandrasekhar et al. .... 370/241 |

(Continued)

FOREIGN PATENT DOCUMENTS

| EP | 2424139 | 2/2012 |
| KR | 1020090086040 | 8/2009 |

(Continued)

OTHER PUBLICATIONS

PCT International Application No. PCT/KR2012/003762, Written Opinion of the International Searching Authority dated Nov. 14, 2012, 11 pages.

(Continued)

*Primary Examiner* — Chi H Pham  
*Assistant Examiner* — Shick Hom  
(74) *Attorney, Agent, or Firm* — Lee, Hong, Degerman, Kang & Waimey

(57) ABSTRACT

The present invention discloses a method for transmitting/receiving data in a wireless access system supporting carrier aggregation/multiple cells, and a base station and a user equipment for same. More particularly, the method comprises the following steps: transmitting downlink control information through a physical downlink control channel (PDCCH) for scheduling downlink data from a first subframe; and transmitting the downlink data, which is scheduled by the downlink control information from a second subframe, through a physical downlink shared channel (PDSCH), wherein the downlink control information includes a field indicating the second subframe from which the downlink data is transmitted.

18 Claims, 20 Drawing Sheets

(52) U.S. Cl.
CPC ............ *H04L5/0053* (2013.01); *H04L 5/0073* (2013.01); *H04L 5/0094* (2013.01); *H04W 72/042* (2013.01)

(56) References Cited

U.S. PATENT DOCUMENTS

2013/0201921 A1* 8/2013 Chen et al. .................... 370/329
2013/0215862 A1* 8/2013 Suzuki et al. ................. 370/329

FOREIGN PATENT DOCUMENTS

| KR | 1020100052646 | 5/2010 |
|---|---|---|
| KR | 1020110030607 | 3/2011 |
| WO | 2010/123331 | 10/2010 |
| WO | 2011/022482 | 2/2011 |
| WO | 2011/032102 | 3/2011 |
| WO | 2011/036986 | 3/2011 |
| WO | 2011053990 | 5/2011 |

OTHER PUBLICATIONS

European Patent Office Application Serial No. 12782048.8, Search Report dated Oct. 29, 2014, 7 pages.
PCT International Application No. PCT/KR2012/003762, Written Opinion of the International Searching Authority dated Nov. 14, 2012, 14 pages.
Huawei, "Enhanced ICIC for control channels to support HetNet," 3GPP TSG RAN WG1 meeting #61 R1-103126, May 2010, 8 pages.
European Patent Office Application Serial No. 12782048.8, Office Action dated Jun. 23, 2015, 7 pages.

* cited by examiner

FIG. 14
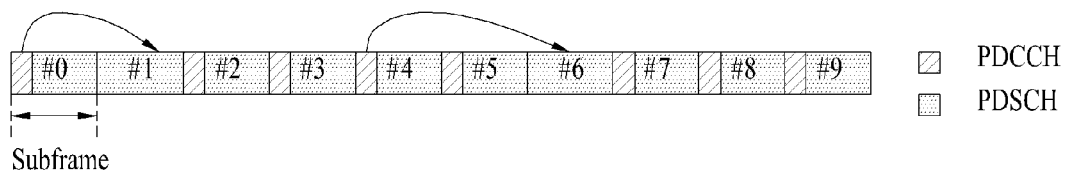
(a)
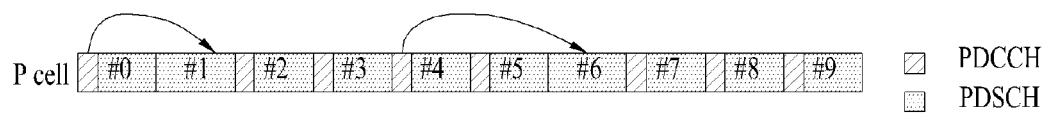
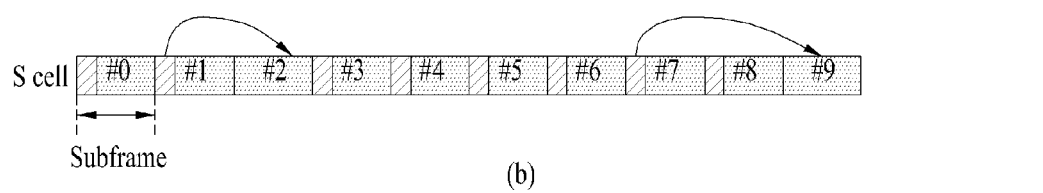
(b)

METHOD FOR TRANSMITTING/RECEIVING DATA IN WIRELESS ACCESS SYSTEM, AND BASE STATION AND USER EQUIPMENT FOR SAME

CROSS-REFERENCE TO RELATED APPLICATIONS

This application is the National Stage filing under 35 U.S.C. 371 of international Application No. PCT/KR2012/003762, filed on May 14, 2012, which claims the benefit of U.S. Provisional Application Ser. No. 61/485,573, filed on May 12, 2011, the contents of which are hereby incorporated by reference herein in their entirety.

TECHNICAL FIELD

The present invention relates to a wireless access system, and more particularly, to a method of transmitting and receiving data in a wireless access system that supports carrier aggregation, and a device for supporting the method.

BACKGROUND ART

One of most important requirements of a next generation wireless access system is to support high data transmission rate requirements. To this end, various technologies such as multiple input multiple output (MIMO), cooperative multiple point transmission (CoMP), a relay, etc. have been developed.

A conventional wireless access system considers only one carrier although bandwidths in uplink and downlink are set in different ways. For example, there is provided a wireless communication system in which the number of carriers included in each of uplink and downlink is one and bandwidths in uplink and downlink are generally symmetric, based on a single carrier.

However, in order to satisfy relatively high data transmission rate requirements to ensure a widebandwidth in consideration of an actual state in which frequency resources are saturated, the system is designed to satisfy basic requirements for operating independent systems in distributed bands and carrier aggregation (CA)/multiple cells whereby a plurality of bands is bonded to one system has been introduced.

Here, a carrier in a bandwidth unit in which independent operations are available may be referred to as a component carrier (CC). In order to increase transmission capacity, recent 3GPP LTE-A or 802.16m has continuously extended up to 20 MHz or more. In this case, one or more CCs are aggregated to support a wideband. For example, when one CC supports a bandwidth of 5 MHz, 10 MHz, or 20 MHz, a maximum of 5 CCs are bonded to support a system bandwidth up to a maximum of 100 MHz.

DISCLOSURE

Technical Problem

An object of the present invention devised to solve the problem lies in a wireless access system, and preferably, a method of smoothly transmitting and receiving uplink/downlink data between a base station and user equipment in a wireless access system that supports carrier aggregation, and a device for the method.

In addition, another object of the present invention devised to solve the problem lies in a method of transmitting and receiving data by performing cross subframe scheduling so as to reduce affection due to interference between homogeneous networks or heterogeneous networks, and a device for the method.

It is to be understood that both the foregoing general description and the following detailed description of the present invention are exemplary and explanatory and are intended to provide further explanation of the invention as claimed.

Technical Solution

The object of the present invention can be achieved by providing a method of transmitting and receiving data in a wireless access system for supporting carrier aggregation, the method including transmitting downlink control information for scheduling downlink data on a physical downlink control channel (PDCCH) in a first subframe, and transmitting the downlink data scheduled according to the downlink control information on a physical downlink shared channel (PDSCH) in a second subframe, wherein the downlink control information includes a field indicating the second subframe for transmission of the downlink data.

In another aspect of the present invention, provided herein is a base station (BS) for transmitting and receiving data in a wireless access system for supporting carrier aggregation, the BS including a radio frequency (RF) unit for transmitting and receiving a radio signal, and a processor for transmitting downlink control information for scheduling downlink data on a physical downlink control channel (PDCCH) in a first subframe, and transmitting the downlink data scheduled according to the downlink control information on a physical downlink shared channel (PDSCH) in a second subframe, wherein the downlink control information includes a field indicating the second subframe for transmission of the downlink data.

In another aspect of the present invention, provided herein is a user equipment (UE) for transmitting and receiving data in a wireless access system for supporting carrier aggregation, the UE including a radio frequency (RF) unit for transmitting and receiving a radio signal, and a processor for receiving downlink control information for scheduling downlink data on a physical downlink control channel (PDCCH) in a first subframe, and receiving the downlink data scheduled according to the downlink control information on a physical downlink shared channel (PDSCH) in a second subframe, wherein the downlink control information includes a field indicating the second subframe for transmission of the downlink data.

The field may indicate an interval between the first subframe and the second subframe.

The field may indicate an index of the second subframe in a radio frame for transmission of the downlink control information.

The field may further indicate a carrier for transmission of the downlink data, and the transmitting of the downlink data may include transmitting the downlink data in the second subframe of a carrier indicated by the field.

The transmitting of the downlink data may include transmitting the downlink data in a carrier for transmission of the downlink control information.

The method may further include indicating a carrier for transmission of the downlink data via upper layer signaling.

The field may be a carrier indicator field (CIF) or a subframe indicator field (SIF).

Advantageous Effects

According to embodiments of the present invention, uplink/downlink data can be smoothly transmitted and received between a base station and user equipment in a wireless access system, particularly, in a wireless access system for supporting carrier aggregation.

According to embodiments of the present invention, affection due to interference can be reduced by performing cross subframe scheduling in which control information of a subframe that is largely affected by interference between homogeneous networks or heterogeneous networks is transmitted via a subframe that is less affected by interference.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 14 is a schematic diagram illustrating the concept of cross subframe scheduling according to an embodiment of the present invention;

BEST MODE

Figure 1:
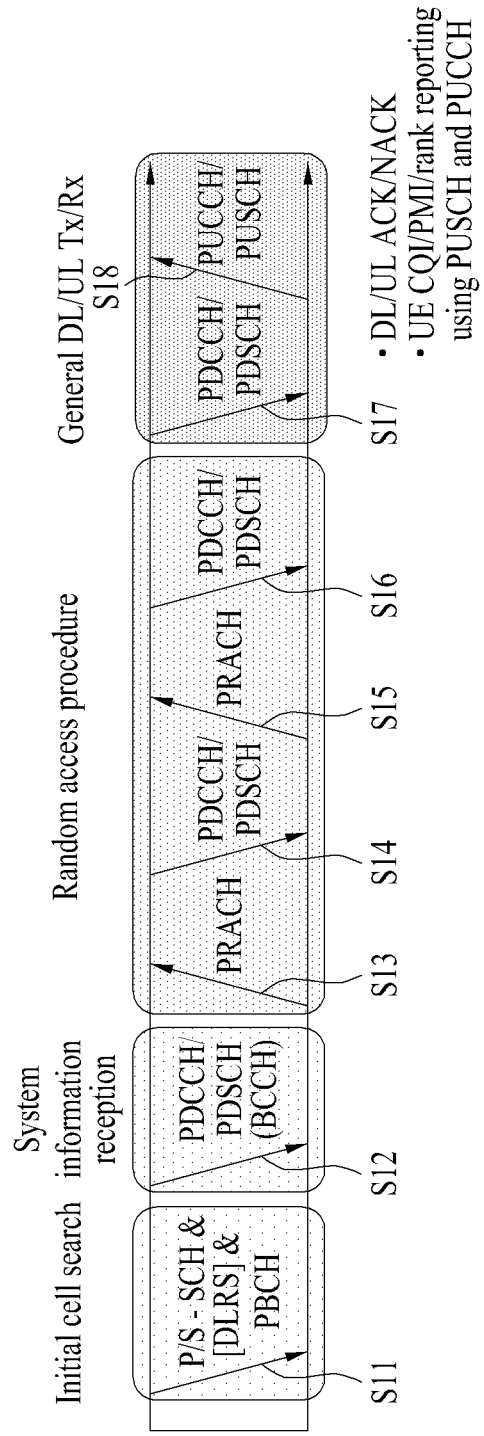
FIG. 1 is a diagram for explanation of physical channels and a general method for transmitting signals on the physical channels in a 3rd generation partnership project (3GPP) long term evolution (LTE) system.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that may be implemented according to the invention. The following detailed description includes specific details in order to provide a thorough understanding of the present invention. However, it will be apparent to those skilled in the art that the present invention may be practiced without such specific details.

In some instances, well-known structures and devices are omitted in order to avoid obscuring the concepts of the present invention and important functions of the structures and devices are shown in block diagram form. The same reference numbers will be used throughout the drawings to refer to the same or like parts.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point as necessary. The term "relay" may be replaced with the terms relay node (RN) or relay station (RS). The term "terminal" may also be replaced with a user equipment (UE), a mobile station (MS), a mobile subscriber station (MSS) or a subscriber station (SS) as necessary.

It should be noted that specific terms disclosed in the present invention are proposed for convenience of description and better understanding of the present invention, and the use of these specific terms may be changed to other formats within the technical scope or spirit of the present invention.

Exemplary embodiments of the present invention are supported by standard documents disclosed for at least one of wireless access systems including an institute of electrical and electronics engineers (IEEE) 802 system, a $3^{rd}$ generation partnership project (3GPP) system, a 3GPP long term evolution (LTE) system, an LTE-advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (utra) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE.

For clarity, the following description focuses on 3GPP LTE/LTE-A. However, technical features of the present invention are not limited thereto.

1. Overview of 3GPP LTE/LTE-A System to which the Present Invention is Applied 1. 1. Overview of System FIG. 1 is a diagram for explanation of physical channels and a general method for transmitting signals on the physical channels in a 3GPP LTE system.

When a UE is powered on or enters a new cell, the UE performs initial cell search (S11). The initial cell search involves acquisition of synchronization to a base station (BS). To this end, the UE synchronizes its timing to the BS and acquires a cell identifier (ID) and other information by receiving a primary synchronization channel (P-SCH) and a secondary synchronization channel (S-SCH) from the BS.

Then the UE may acquire information broadcast in the cell by receiving a physical broadcast channel (PBCH) from the BS. During the initial cell search, the UE may monitor a downlink channel state by receiving a downlink reference signal (DL RS).

After the initial cell search, the UE may acquire detailed system information by receiving a physical downlink control channel (PDCCH) and a physical downlink shared channel (PDSCH) based on information included in the PDCCH in S12.

In order to complete access to the BS, the UE may perform a random access procedure with the BS (S13 to S16). In the random access procedure, the UE may transmit a preamble on a physical random access channel (PRACH) (S13), and may receive a response message to the preamble on a PDCCH and a PDSCH corresponding to the PDCCH (S14). In case of a contention-based RACH, the UE may additionally perform a contention resolution procedure such as transmission (S15) of an additional PRACH signal and reception (S16) of a PDCCH signal and a PDSCH corresponding to the PDCCH signal.

After the above procedure, the UE may receive a PDCCH and/or a PDSCH from the BS (S17) and transmit a physical uplink shared channel (PUSCH) and/or a physical uplink control channel (PUCCH) to the BS (S18), which is a general downlink and uplink signal transmission procedure.

Control information that the UE transmits to the BS is called uplink control information (UCI). The UCI includes hybrid automatic repeat and request acknowledgement/negative-ack (HARQ-ACK/NACK), scheduling request (SR), channel quality indication (CQI), precoding matrix indication (PMI), Rank Indication (RI) information, etc.

In an LTE system, in general, the UCI is periodically transmitted through a PUCCH. However, in order to simultaneously transmit control information and traffic data, the UCI may be transmitted through a PUSCH. In addition, the UCI may be aperiodically transmitted through a PUSCH according to a request/command of a network.

Figure 2:
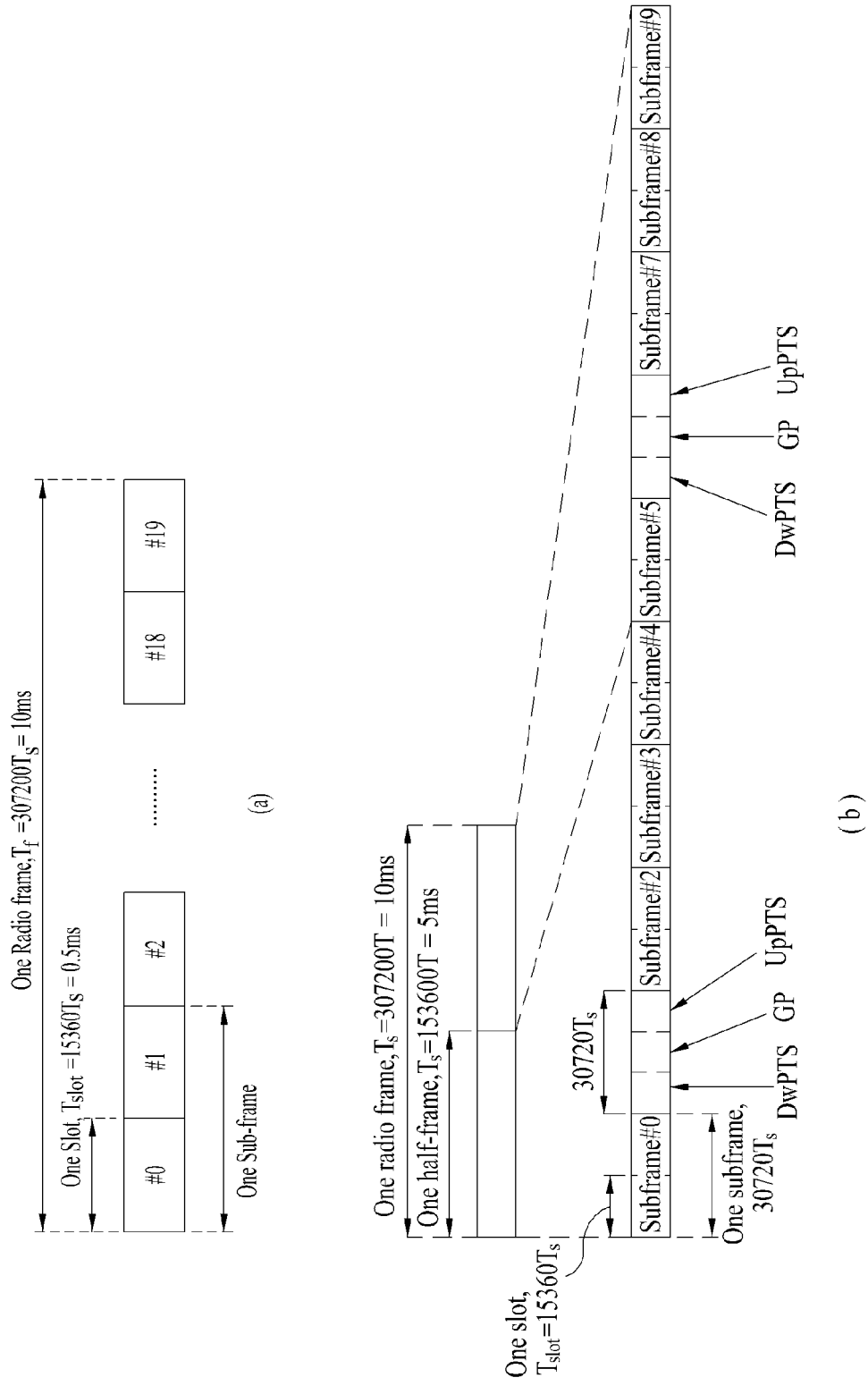
FIG. 2 is a diagram illustrating a structure of a radio frame used in a 3GPP LTE.

FIG. 2 is a diagram illustrating a structure of a radio frame used in a 3GPP LTE.

FIG. 2(*a*) illustrates a frame structure type 1 The frame structure type 1 may be applied to both a full duplex frequency division duplex (FDD) system and a half duplex FDD system.

One radio frame has a length of $T_f=307200 \cdot T_s=10$ ms and a uniform length of $T_{slot}=15360 \cdot T_s=0.5$ ms. Each radio frame is divided into 20 slots with indexes of 0 to 19. One subframe is defined as two contiguous slots and an ith subframe includes slots corresponding to 2i and 2i+1. That is, a radio frame includes ten subframes. Time for transmission of one subframe is referred to as a transmission time interval (TTI). Here, Ts denotes sampling time and is represented by $Ts=1/(15 \text{ kHz} \times 2048)=3.2552 \times 10^{-8}$ (about 33 ns). A slot includes a plurality of OFDM symbols or SC-FDMA symbols in a time domain and includes a plurality of resources block in a frequency domain.

One slot includes a plurality of orthogonal frequency division multiplexing (OFDM) symbols in a time domain. A 3GPP LTE uses the OFDMA in downlink and thus the OFDM symbol is used to represent one symbol period. The OFDM symbol may be referred to as one SC-FDMA symbol or symbol period. A resource block is a resource allocation unit and includes a plurality of contiguous subcarriers in one slot.

In the full duplex FDD system, ten subframes may be simultaneously used for downlink transmission and uplink transmission during each period of 10 ms. In this case, uplink and downlink transmission are separated in a frequency domain. On the other hand, in the half duplex FDD system, a UE cannot simultaneously perform transmission and reception.

The aforementioned structure of the radio frame is purely exemplary and thus the number of subframes included in the radio frame, the number of slots included in a subframe, or the number of OFDM symbols included in a slot may be changed in various ways.

FIG. 2(*b*) illustrates a frame structure type 2. The frame structure type 2 may be applied to a TDD system. One radio frame has a length of $T_f=307200 \cdot T_s=10$ ms and two half frames having a length of $153600 \cdot T_s=5$ ms. Each half frame includes five subframes having a length of $30720 \cdot T_s=1$ ms. An ith subframe includes two slots with a length of $T_{slot}=15360 \cdot T_s=0.5$ ms corresponding to 2i to 2i+1. Here, Ts denotes sampling time and is represented by $Ts=1/(15 \text{ kHz} \times 2048)=3.2552 \times 10^{-8}$ (about 33 ns).

The frame structure type 2 includes a special subframe including three fields of a downlink pilot time slot (DwPTS), guard period (GP), and uplink pilot time slot (UpPTS). Here, the DwPTS is used for initial cell search, synchronization or channel estimation at user equipment (UE). The UpPTS is used to synchronize channel estimation at the base station with uplink transmission of the UE. The GP is to remove interference occurring in uplink due to multipath delay of downlink signals between uplink and downlink.

Table 1 below shows a special frame configuration (length of DwPTS/GP/UpPTS).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

UL-DL configurations for frame structure type 2 represent rules of allocating (or reserving) each subframe as a DL subframe or a UL subframe. Table 2 below lists such UL-DL configurations.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 6 above, "D" represents a DL subframe, "U" represents a UL subframe, and "S" represents a special subframe including a DwPTS, a GP, and an UpPTS in a radio frame. 7 UL-DL configurations are available and differ in the positions or numbers of DL subframes, special subframes, and UL subframes.

A time point at which DL switches to UL or UL switches to DL is called a switch point. Switch-point periodicity is a period in which switching between a UL subframe and a DL subframe is repeated in the same manner. The switch-point periodicity is 5 ms or 10 ms. If the switch-point periodicity is 5 ms, a special subframe S exists in every half-frame and if the switch-point periodicity is 5 ms, a special subframe S is confined to the first half-frame.

In every UL-DL configuration, subframe 0, subframe 5, and the DwPTS are used for DL transmission, and the UpPTS and the subframe following a special subframe are always used for UL transmission.

The UL-DL configurations are system information that may be known to both an eNB and UEs. Each time UL-DL configuration information is changed, the eNB may indicate the change in the UL-DL allocation state of a radio frame to a UE by transmitting only the index of configuration information. The configuration information is a kind of DCI and may be transmitted on a DL control channel, PDCCH like other scheduling information. The configuration information may be broadcast to all UEs within a cell on a BCH. The number of half-frames in a radio frame, the number of subframes in a half-frame, and DL-UL subframe combinations in the TDD system are purely exemplary.

In an FDD system, HARQ ACK/NACK that is transmitted on a PHICH in an ith subframe is associated with a PUSCH transmitted in an (i−4)th subframe.

On the other hand, DL/UL subframe configuration in a TDD system differs according to UL/DL configuration and thus PUSCH and PHICH transmission time may be configured in different ways according to configuration and the PUSCH and PHICH transmission time may be configured in different ways according to a subframe index (or number).

In a LTE system, a UL/DL timing relationship of a PUSCH and a PDCCH preceding the PUSCH, and a PHICH on which DL HARQ ACK/NACK corresponding to PUSCH is transmitted is predetermined.

Figure 3:
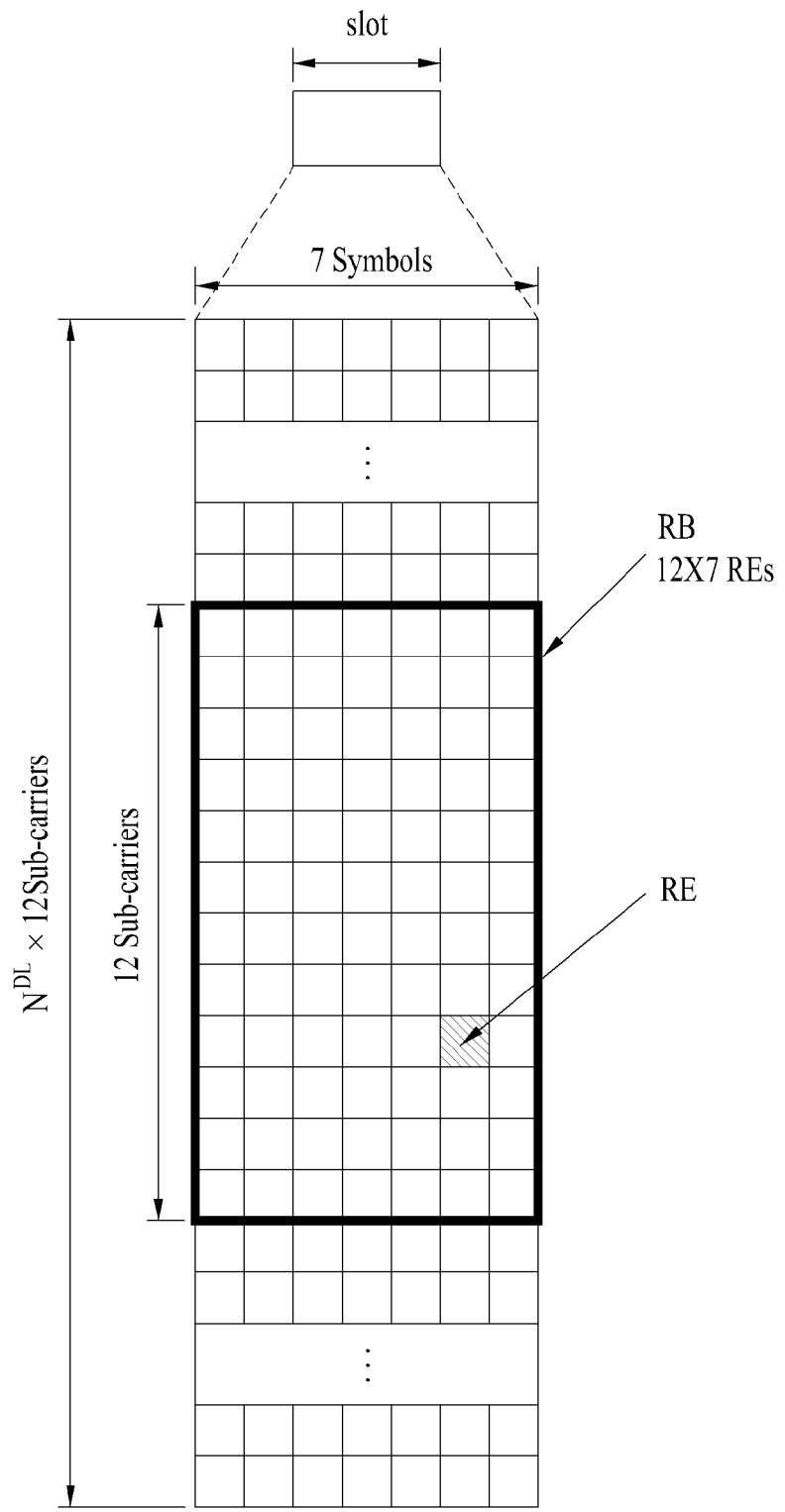
FIG. 3 is a diagram illustrating an example of a resource grid of a downlink slot.

FIG. 3 is a diagram illustrating an example of a resource grid of a downlink slot.

Referring to FIG. 3, one downlink slot includes a plurality of OFDM symbols in a time domain. Here, a downlink slot includes 7 OFDM symbols in a time domain and a resource block (RB) includes 12 subcarriers in a frequency domain, which does not limit the scope and spirit of the present invention.

Each element of the resource grid is referred to as a resource element (RE). An RB includes 12×7 REs. The number of RBs in a downlink slot, $N^{DL}$ depends on a downlink transmission bandwidth. An uplink slot may have the same structure as a downlink slot.

Figure 4:
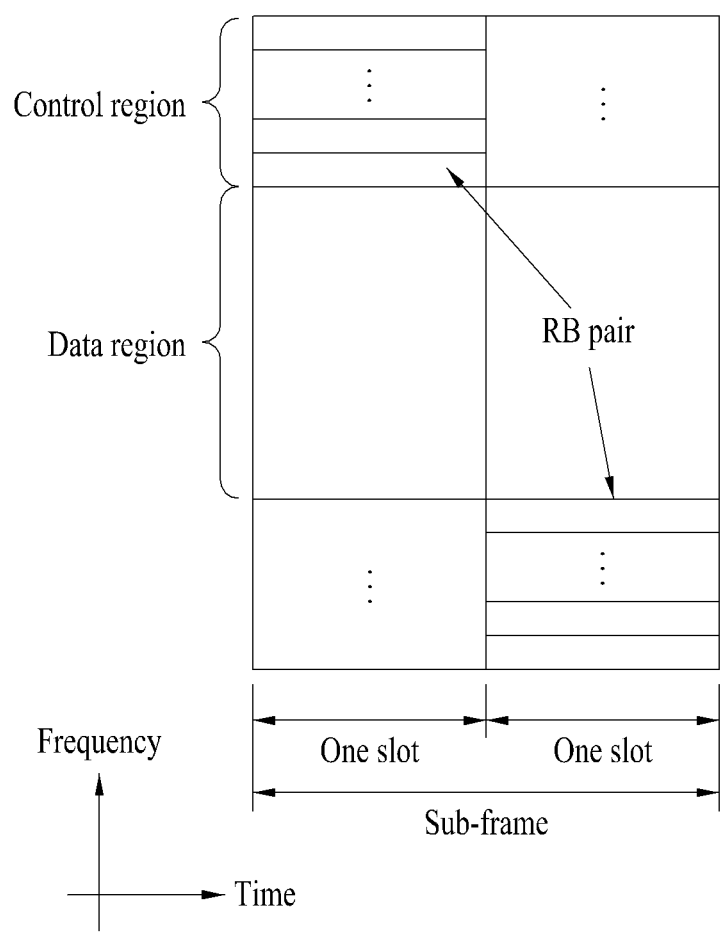
FIG. 4 is a diagram illustrating a structure of an uplink subframe.

FIG. 4 is a diagram illustrating a structure of an uplink subframe.

Referring to FIG. 4, the uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Figure 5:
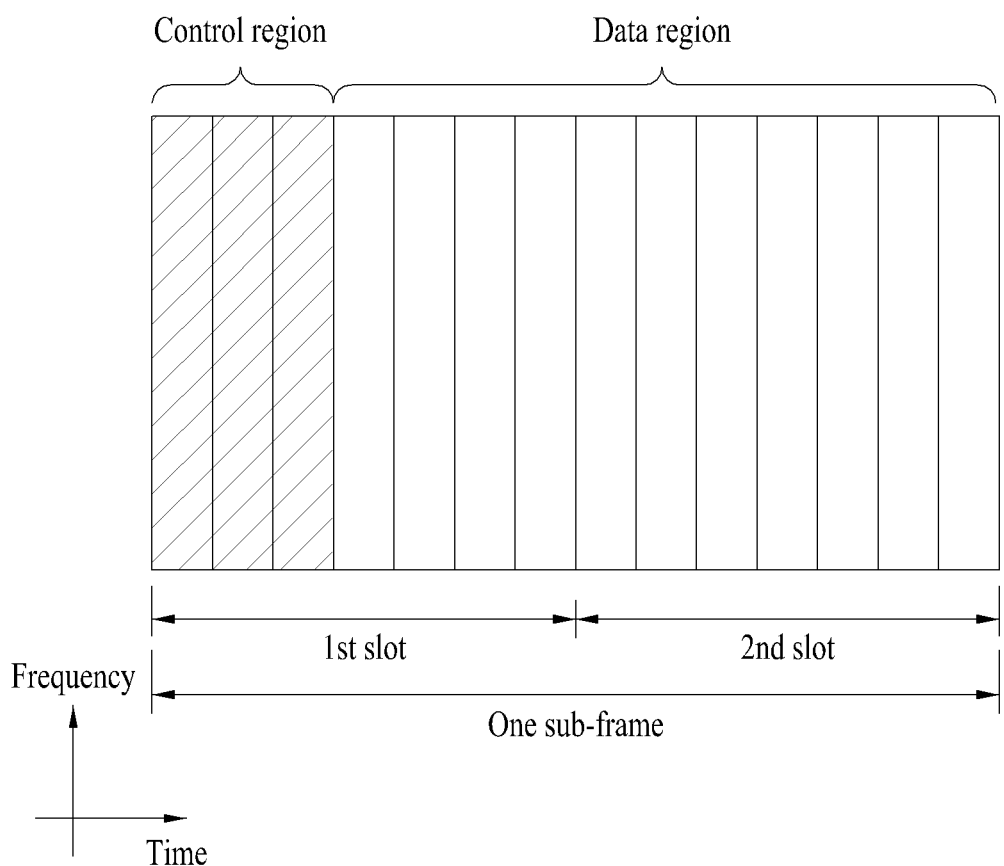
FIG. 5 is a diagram illustrating a structure of a downlink subframe.

FIG. 5 is a diagram illustrating a structure of a downlink subframe.

Referring to FIG. 5, a maximum of 3 OFDM symbols at the start of the first slot in the subframe are used for a control region to which control channels are allocated and the other OFDM symbols of the downlink subframe are used for a data region to which a PDSCH is allocated. Downlink control channels used in the 3GPP LTE system include, for example, a physical control format indicator channel (PCFICH), a physical downlink control channel (PDCCH), and a physical hybrid automatic repeat request (HARQ) indicator channel (PHICH).

The PCFICH is transmitted in the first OFDM symbol of a subframe, carrying information (that is, area of control region) about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink allocation information, or uplink transmission (Tx) power control commands for UE groups.

1. 2. PDCCH (Physical Downlink Control Channel)
1. 2. Physical Downlink Control Channel (PDCCH)
1. 2. 1. Overview of PDCCH PDCCH may carry resource allocation and transmission format of downlink shared channel (DL-SCH) (which is referred to as downlink grant.), resource allocation information of uplink shared channel (UL-SCH) (which is referred to as uplink grant), paging information on paging channel (PCH), system information on DL-SCH, resource allocation of upper-layer control message such as a random access response transmitted on a PDSCH, a Tx power control command set of individual UEs in a UE group, activation indication information of voice over IP (VoIP), etc. A plurality of PDCCHs may be transmitted in a control region. A UE may monitor a plurality of PDCCHs. A PDCCH includes one control channel element (CCE) or an aggregate of one or several contiguous CCEs. The PDCCH including one CCE or the aggregate of the contiguous CCEs may be subblock-interleaved and transmitted through the control region. The CCE is a logical allocation unit used to provide a coding rate to a PDCCH based on a radio channel state. The CCE corresponds to a plurality of resource element groups (REGs). PDCCH format and a bit number of available PDCCH are determined according to a relationship between the number of the CCEs and the coding rate provided from the CCEs 1. 2. 2. Structure of PDCCH A plurality of multiple PDCCHs for a plurality of UEs may be transmitted in a control region. The PDCCH includes aggregation of one or two contiguous CCES. A CCE refers to a unit corresponding to 9 sets of REGs including four resource elements. Four quadrature phase shift keying (QPSK) symbols are mapped to each REG. Resource elements occupied by reference signals (RSs) are not included in the REG. That is, a total number of REGs in an OFDM symbol may be changed according to whether a cell-specific reference signal is present. A concept of the REG for mapping four resource elements to one group can also be applied to different downlink control channels (e.g., PCFICH or PHICH). When REG that is not allocated to PCFICH or PHICH is $N_{REG}$, the number of available CCEs in the system is $N_{CCE}=\lfloor N_{REG}/9 \rfloor$ and each CCE has an index from 0 to $N_{CCE}-1$.

In order to simplify a decoding procedure of a UE, a PDCCH format including n CCEs may be started from CCEs having the same index as multiple of n. That is, when a CCE index is i, the PDCCH format may be started from a CCE that satisfies i mod n=0.

A BS may use 1, 2, 4, or 8 CCEs in order to configure one PDCCH signal. In this case, {1, 2, 4, 8} is referred to as a CCE aggregation level. The number of CCEs used for transmission of a specific PDCCH is determined by the BS according to a channel state. For example, only one CCE may be sufficient for a PDCCH for a UE having a satisfactory downlink channel state (when the UE is close to the BS). On the other hand, a UE having a poor channel state (when the UE is located at a cell edge) requires 8 CCEs for sufficient robustness. In addition, a power level of the PDCCH may match a channel state and adjusted.

Table 3 below shows a PDCCH format. Four PDCCH formats are supported according to a CCE aggregation level as shown in Table 1 above.

TABLE 3

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCE aggregation levels are different for respective UEs because modulation and coding scheme (MCS) levels or formats of control information contained in a PDCCH are different. An MCS level refers to a code rate and modulation order used in data coding. An adaptive MCS level is used for link adaptation. In general, a control channel for transmission of control information may consider 3 to 4 MCS levels.

A format of control information is now described. Control information transmitted on the PDCCH is referred to as downlink control information (DCI). According to a DCI format, configuration of information contained in PDCCH payload may be changed. The PDCCH payload refers to an information bit. Table 4 below shows a DCI according to a DCI format.

TABLE 4

| DCI Format | Description |
|---|---|
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |

As shown in Table 4 above, a DCI format includes Format 0 for PUSCH scheduling, Format 1 for scheduling of one PDSCH codeword, Format 1A for compact scheduling of one PDSCH codeword, Format 1C for very compact scheduling of DL-SCH, Format 2 for PDSCH scheduling in a closed-loop spatial multiplexing mode, Format 2A for PDSCH scheduling in an open-loop spatial multiplexing mode, and Formats 3 and 3A for transmission of a transmission power control (TPC) command for an uplink channel. The DCI Format 1A may be used for PDSCH scheduling regardless of a transmission mode configured for a UE.

A length of the PDCCH payload may be changed according to a DCI format. In addition, a type of the PDCCH payload and a length of the PDCCH payload according thereto may be changed according to whether compact scheduling is used or not or a transmission mode configured for the UE.

The transmission mode may be configured in such a way that the UE receives downlink data on a PDSCH. For example, the downlink data on the PDSCH may include data scheduled for the UE, paging, random access response, or broadcast information on a BCCH. The downlink data on the PDSCH is associated with a DCI format signaled on the PDCCH. The transmission mode may be semi-statically configured in the UE via upper layer signaling (e.g., radio resource control (RRC) signaling). The transmission mode may be classified into a single antenna transmission mode or a multi-antenna transmission mode. The UE may semi-statically establish the transmission mode via upper layer signaling. For example, multiple-antenna transmission is performed using transmit diversity, open-loop or closed-loop spatial multiplexing, multi-user-multiple input multiple output (MU-MIMO), beamforming, or the like. The transmit diversity is technology for transmitting the same data in a multiple Tx antennas to increase transmission reliability. The spatial multiplexing is technology for simultaneously transmitting different data in a multiple Tx antenna to transmit data at high speed without increase in bandwidth of a system. The beamforming is technology for applying a weight according to a channel state in a multiple antenna to increase signal to interference plus noise ratio (SINR) of a signal.

The DCI format depends on a transmission mode configured for the UE. The UE may use a reference DCI format monitored thereby according to a transmission mode configured for the UE. The transmission mode configured for the UE may include the following seven transmission modes.

(1) single antenna port; port 0
(2) transmit diversity
(3) open-loop spatial multiplexing
(4) closed-loop spatial multiplexing
(5) multiple user MIMO
(6) closed loop=1 precoding
(7) single antenna port; port 5

1. 2. 3. PDCCH Transmission

A BS determines a PDCCH format according to DCI to be transmitted to a UE and adds cyclic redundancy check (CRC) to control information. The CRC is masked by a dedicated identifier (ID) (which is known as a radio network temporary identifier (RNTI)) according to the owner or usage of the PDCCH. If the PDCCH is destined for a specific UE, the CRC may be masked by a dedicated ID, for example, a cell-RNTI (C-RNTI) of the UE. If the PDCCH carries a paging message, the CRC of the PDCCH may be masked by a paging indicator identifier (P-RNTI). If the PDCCH carries system information, particularly, a system information block (SIB), its CRC may be masked by a system information ID and a system information RNTI (SI-RNTI). To indicate that the PDCCH carries a random access response to a random access preamble transmitted by a UE, its CRC may be masked by a random access-RNTI (RA-RNTI).

Then the BS channel-codes the control information to which the CRC is added to generate coded data. In this case, the channel coding may be performed with a code rate according to an MCS level. The BS performs transmission rate matching according to a CCE aggregation level allocated to a PDCCH format and modulates the coded data to generate modulation symbols. In this case, a modulation sequence according to an MCS level may be used. A CCE aggregation level of modulation symbols included in one PDCCH may be any one of 1, 2, 4, and 8. Then the BS performs CCE to RE mapping on the modulation symbols.

1. 2. 4. Blind Decoding

A plurality of PDCCHs may be transmitted in one subframe. That is, a control region of one subframe includes a plurality of CCEs with an index 0 to $N_{CCE,k}-1$. Here, $N_{CCE,k}$ refers to a total number of CCEs in a control region of a kth subframe. A UE monitors a plurality of PDCCHs every subframe. Here, monitoring refers to trial of decoding of PDCCHs according to a PDCCH format monitored by the UE. The BS does not provide information regarding a position of corresponding PDCCH to the UE via a control region allocated in a subframe. In order to receive a control channel transmitted from the BS, the UE cannot know a position where PDCCH of the UE is transmitted and a CCE aggregation level or a DCI format at which the PDCCH is transmitted, and thus the UE monitors a set of PDCCH candidates in a subframe to search for a PDCCH for the UE, which is called blind decoding/detection (BD). The BD refers to a method in which a UE de-masks a UE ID of the UE to a CRC portion and then checks CRC errors to check whether corresponding PDCCH is a control channel of the UE.

In an active mode, the UE monitors a PDCCH every subframe in order to receive data transmitted to the UE. In a DRX mode, the UE wakes up in a monitoring duration every DRX period and monitors PDCCH in a subframe corresponding the monitoring duration. A subframe in which monitoring of PDCCH is performed is referred to as a non-DRX subframe.

The UE needs to perform binding decoding on all CCEs present in a control region of the non-DRX subframe in order to receive PDCCH transmitted to the UE. The UE cannot know a format of the transmitted PDCCH. Thus, all PDCCHs need to be decoded at an available CCE aggregation level until blind decoding of the PDCCH is successfully performed every non-DRX subframe. The UE cannot know the number of CCEs used by PDCCH for the UE and thus the UE needs to try detection at all available CCE aggregation levels until blind decoding of PDCCH is successfully performed.

An LTE system defines the concept of a search space (SS) for blind decoding of the UE. The SS may refer to a PDCCH candidate set to be monitored and have different sizes according to a PDCCH format. The SS may include a common search space (CSS) and UE-specific/dedicated search space (USS). With regard to the CSS, all UEs can know the size of the CSS. However, the USS can be separately configured for each respective UE. Thus, the UE needs to monitor both the CSS and the USS in order to decode PDCCH and thus needs to perform BD a maximum of 44 times in one subframe. Here, BD performed according to different CRC values (e.g., C-RNTI, P-RNTI, SI-RNTI, and RA-RNTI) is not used.

Due a small SS, the BS cannot frequently ensure CCE resources for transmitting a PDCCH to all UEs that desire to transmit a PDCCH in a predetermined subframe. This is because remaining resources after a CCE position is allocated may not be included in the SS of a specific UE. In order to minimize this problem that may continuously arises in a next subframe, a UE-specific hopping sequence may be applied to a start point of the USS.

Table 5 below shows sizes of the CSS and the USS.

TABLE 5

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

In order to reduce calculation load of the UE according to the number of trails of blind decoding, the UE does not simultaneously perform searches according to all defined DCI formats. In detail, the UE always performs searches on the DCI format 0 and 1A in the USS. In this case, the DCI formats 0 and 1A have the same size. However, the UE can differentiate DCI formats using flag for format 0/format 1A differentiation used to differentiate the DCI formats 0 and 1A included in PDCCH. In addition, the UE may require other DCI formats other than the formats 0 and 1A, for example, the DCI formats 1, 1B, and 2.

In the CSS, the UE may search for the DCI formats 1A and 1C. In addition, the UE may be configured to search for the DCI format 3 or 3A and the DCI formats 3 and 3A have the same size as the DCI formats 0 and 1A. However, the UE may identify a DCI format using a scrambled CRC using other identifiers other than a UE-specific ID.

A search space $S_k^{(L)}$ refers to a PDCCH candidate set according to an aggregation level $L \in \{1,2,4,8\}$. A CCE according to a PDCCH candidate set m of an SS may be determined according to Expression 1 below.

$$L \cdot \{(Y_k+m) \bmod \lfloor N_{CCE,k}/L \rfloor\} + i \quad \text{[Expression 1]}$$

Here, $M^{(L)}$ is the number of PDCCH candidates according to a CCE aggregation level L for monitoring in an SS and satisfies m=0, ..., $M^{(L)}$−1. i is an index for determination of a separate CCE in each respective PDCCH candidate in the PDCCH and satisfies i=0, ..., L−1. $k=\lfloor n_s/2 \rfloor$ is satisfied and $n_s$ is a slot index in a radio frame.

As described above, the UE monitors both a USS and a CSS in order to decode the PDCCH. Here, the CSS supports PDCCHs having an aggregation level of {4, 8} and the USS supports PDCCHs having an aggregation level of {1, 2, 4, 8}. Table 6 below shows PDCCH candidates monitored by the UE.

TABLE 6

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

Referring to Expression 1 above, in case of the CSS, $Y_k$ is configured to 0 with regard to two aggregation levels, L=4 and L=8. On the other hand, in case of the USS, $Y_k$ is defined according to Expression 2 below with regard to an aggregation level L.

$$Y_k = (A \cdot Y_{k-1}) \bmod D \quad \text{[Expression 2]}$$

Here, $Y_{-1} = n_{RNTI} \neq 0$ is satisfied and $n_{RNTI}$ is RNTI. In addition, A=39827 and D=$65537$ are satisfied.

2. Carrier Aggregation Environment 2. 1. Overview of Carrier Aggregation

Communication environments considered in embodiments of the present invention include all multi-carrier environments. That is, a multi-carrier system or a multi-carrier aggregation system refers to a system that aggregates one or more component carriers (CCs) each having a smaller bandwidth than a target bandwidth in order to support a wideband in the present invention.

In the present invention, multi-carrier means carrier aggregation (or carrier combining). Carrier aggregation covers aggregation of non-contiguous carriers as well as aggregation of contiguous carriers. In addition, the number of CCs that are aggregated in downlink and uplink may be configured in different ways. A case in which the number of downlink CCs and the number of uplink CCs are the same is referred to as symmetric aggregation, and a case in which the number of downlink CCs and the number of uplink CCs are different is referred to as asymmetric aggregation. The term carrier aggregation is interchangeably used with bandwidth aggregation, spectrum aggregation, etc.

The LTE-A system aims to support a bandwidth of up to 100 MHz by use of multi-carriers (i.e. carrier aggregation) configured by aggregating two or more CCs. To guarantee backward compatibility with a legacy IMT system, each of one or more carriers, which has a smaller bandwidth than a target bandwidth, may be limited to a bandwidth used in the legacy system. For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present invention may support CA by defining a new bandwidth irrespective of the bandwidths used in the legacy system.

The LTE-A system adopts the concept of a cell to manage radio resources. The aforementioned carrier aggregation environment may refer to a multiple cell environment. A cell is defined by combining DL and UL resources, although the UL resources are not a necessity. Accordingly, a cell may be configured with DL resources alone or DL and UL resources. When a specific UE has only one configured serving cell, the cell may have one DL CC and one UL CC. When a specific UE has two or more configured serving cells, the cells may has DL CCs, the number of which is equal to the cells, and UL CCs, the number of which is equal to or less than the DL CCs. On the other hand, DL CCs and UL CCs may be configured in an opposite way. That is, when a specific UE has a plurality of configured serving cells, a carrier aggregation environment in which the number of DL CCs is more than the number of UL CCs may be supported. That is, carrier aggregation is interpreted as aggregation of plural cells having different carrier frequencies (center frequencies of the cells). Here, the term 'cell' used herein needs to be distinguished from a 'cell' as a region covered by a BS.

A cell used in the LTE-A system includes a primary cell (PCell) and a secondary cell (SCell). The PCell and the SCell may be used as serving cells. If the UE is in RRC_CONNECTED state but carrier aggregation has not been configured or is not supported in the UE, only one serving cell including a PCell exists for the UE. On the other hand, if the UE is in RRC_CONNECTED state and carrier aggregation has been configured for the UE, one or more serving cells may exist for the UE. The total serving cells include a PCell and one or more SCells.

The serving cells (the Pcell and the S cell) may be configured via an RRC parameter. PhysCellId is a physical layer ID of a cell and has an integer of 0 to 503. SCellIndex is a short ID used for identifying the S cell and has an integer of 1 to 7. ServCellIndex is a short ID for identifying the serving cell (the P cell or the S cell) and has an integer of 0 to 7. 0 is applied to the P cell and SCellIndex is pre-given so as to be applied to the S cell. That is, a cell having a smallest cell ID (or a cell index) of ServCellIndex is the P cell.

The P cell refers to a cell that operates at a primary frequency (or a primary CC). The P cell may be used to perform an initial connection establishment procedure or a connection reconfiguration procedure via a UE and refer to a cell indicated during a handover procedure. In addition, the P cell is a cell serving as a center of control-related communication among cells configured in a CA environment. That is, a UE may be allocated with a PUCCH only in a P cell of the UE and transmit the PUCCH. In addition, the UE may use only the P cell to acquire system information or change a monitoring procedure. Evolved universal terrestrial radio access (E-UTRAN) may change only the P cell for a handover procedure using an RRCConnectionReconfigutaion message of an upper layer, containing mobilityControlInfo in a UE that supports a CA environment.

The S cell may refer to a cell that operates at a secondary frequency (or a secondary CC). Only one P cell may be allocated to a specific UE and one or more S cells may be allocated to the UE. The S cell can be configured after RRC connection is established and used to supply additional radio resources. Among serving cells configured in the CA environment, a PUCCH is not present in cells except for P cells, that is, S cells. When S cells are added to the UE that supports the CA environment, the E-UTRAN may supply all system information related to an operation of a related cell in RRC_CONNECTED state through a dedicated signal. Change in the system information may be controlled according to release and addition of related S cells. In this case, an RRCConnectionReconfigutaion message of an upper layer may be used. The E-UTRAN may perform dedicated signaling with different parameters for respective UEs instead of broadcasting in related S cells.

After an initial security activation procedure is initiated, the E-UTRAN may add one or more S cells to a P cell that is initially configured during a connection establishment procedure to configure a network including one or more S cells. In a CA environment, the P cell and the S cell may act as component carriers. In the following embodiments of the present invention, a primary component carrier (PCC) may have the same meaning as the P cell and a secondary component carrier (SCC) may have the same meaning as the S cell.

Figure 6:
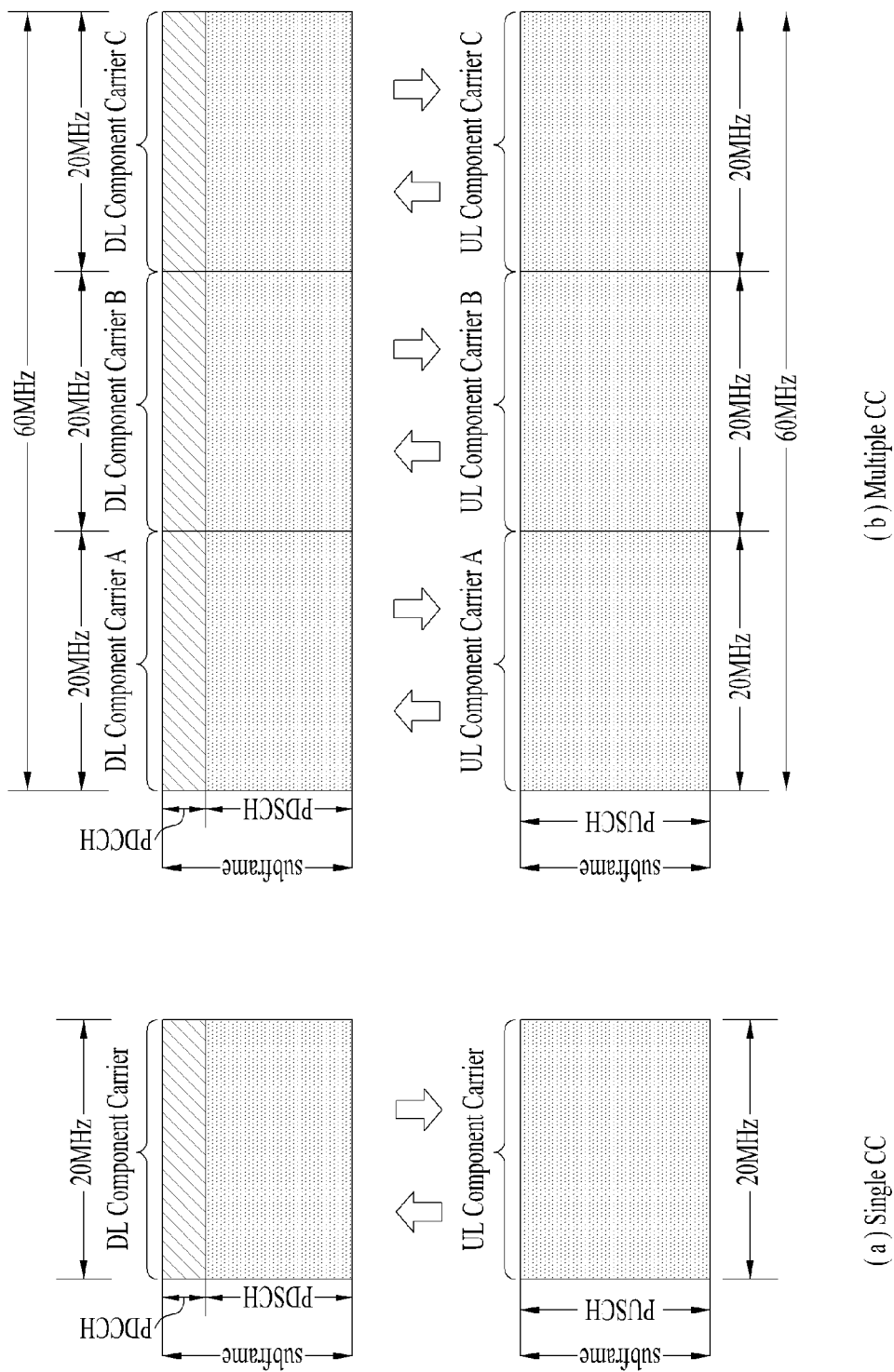
FIG. 6 is a diagram illustrating an example of a component carrier (CC) of an LET system and CA used in an LTE_A system.

FIG. 6 is a diagram illustrating an example of a component carrier (CC) of an LET system and CA used in an LTE_A system.

FIG. 6(a) illustrates a single carrier structure used in the LTE system. The CC includes a DL CC and a UL CC. One CC may have a frequency range of 20 MHz.

FIG. 6(b) illustrates a CA structure used in the LTE_A system. FIG. 10(b) illustrates a case in which three CCs with a frequency of 20 MHz are combined. Although three DL CCs and three UL CCs are illustrated, the number of the DL CCs and UL CCs are not limited. In case of CA, a UE may simultaneously monitor three CCs, receive downlink signals/data, and transmit uplink signals/data.

When N DL CCs are managed in a specific cell, a network may allocate M ($M \leq N$) DL CCs to a UE. In this case, the UE may monitor only the M limited DL CCs and receive a DL signal. In addition, the network may apply priority L ($L \leq M \leq N$) DL CCs to allocate a primary DL CC to the UE. In this case, the UE should monitor L DL CCs. This manner may be applied to uplink transmission in the same way.

The linkage between the carrier frequency of DL resources (or a DL CC) and the carrier frequency of UL resources (or a UL CC) may be indicated by system information or an upper layer message such as an RRC message. For example, a combination of DL resources and UL resources may be configured by the linkage defined by a system information block type 2 (SIB2). In detail, the linkage may refer to a mapping relationship between DL CC for transmission of PDCCH for carrying UL grant and UL CC using the UL grant or a mapping relationship between DL CC (or UL CC) for transmission of data for HARQ and UL CC (or DL CC) for transmission of an HARQ ACK/NACK signal.

2. 2. Cross Carrier Scheduling

In a CA system, from a point of view of scheduling on a serving cell or carrier, there are two methods, i.e., self-scheduling and cross carrier scheduling. The cross carrier scheduling may refer to cross component carrier scheduling or cross cell scheduling.

The self-scheduling refers to transmission of PDCCH (DL grant) and PDSCH via the same DL CC or transmission of PUSCH, transmitted on PDCCH (UL grant) transmitted via DL CC, via UL CC linked with DL CC for reception of UL grant.

The cross carrier scheduling refers to transmission of a PDCCH (DL grant) and PDSCH via different DL CCs or transmission of a PUSCH, transmitted on a PDCCH (UL grant) transmitted via a DL CC, via a UL CC that is not an UL CC linked with DL CC for reception of UL grant.

Whether to perform the cross carrier scheduling may be activated or deactivated UE-specifically or semi-statically known for each respective UE via upper layer signaling (e.g., RRC signaling).

When the cross carrier scheduling is activated, a PDCCH requires a carrier indicator field (CIF) indicating DL/UL CC for transmission of PDSCH/PUSCH indicated by the corresponding PDCCH. For example, the PDCCH may allocate PDSCH resources or PUSCH resources to one of a plurality of CCs using the CIF. That is, when the PDSCH or PUSCH resources are allocated to one of DL/UL CC via which PDCCH on DL CC is multiple-aggregated, the CIF is configured. In this case, a DCI format of LTE-A Release-8 may be extended according to the CIF. In this cast, the configured CIF may be fixed to a 3 bit field or fixed regardless of a DCI format size. In addition, a LTE-A Release-8 PDCCH structure (the same coding and same CCE-based resource mapping) may be reused.

On the other hand, when a PDCCH on a DL CC allocates PDSCH resources on the same DL CC or allocates PUSCH resources on single-linked UL CC, the CIF is not configured. In this case, the same PDCCH structure (the same coding and same CCE-based resource mapping) and the same DCI format as LTE-A Release-8 may be used.

When the cross carrier scheduling is possible, the UE needs to monitor a PDCCH of a plurality of DCIs in a control region of monitoring CC according to a transmission mode and/or bandwidth for each respective CC. Thus, PDCCH monitoring and configuration of a search space for supporting this are required.

In a multiple carrier system, a UE DL CC set is a set of DL CCs scheduled such that the UE receives a PDSCH and a UE UL CC set is a set of UL CCs scheduled such that the UE transmits a PUSCH. In addition, a PDCCH monitoring set is a set of at least one DL CC that performs the PDCCH monitoring. A PDCCH monitoring set may be the same as a UE DL CC or a subset of the UE DL CC set. The PDCCH monitoring set may include at least one of DL CCs in the UE DL CC set. Alternatively, the PDCCH monitoring set may be defined regardless of the UE DL CC set. A DL CC included in the PDCCH monitoring set may be configured such that self-scheduling with respect to UL CC linked with the DL CC is always possible. The UE DL CC set, the UE UL CC set, and the PDCCH monitoring set may be set UE-specifically, UE group-specifically, or cell-specifically.

When the cross component carrier scheduling is deactivated, the PDCCH monitoring set is always the same as the UE DL CC set. In this case, indication such as separate signaling with respect to the PDCCH monitoring set is not required. However, when the cross component carrier scheduling is activated, it is preferable that the PDCCH monitoring set is defined in the UE DL CC set. That is, in order to schedule a PDSCH or PUSCH for a UE, a BS transmits a PDCCH via the PDCCH monitoring set only.

Figure 7:
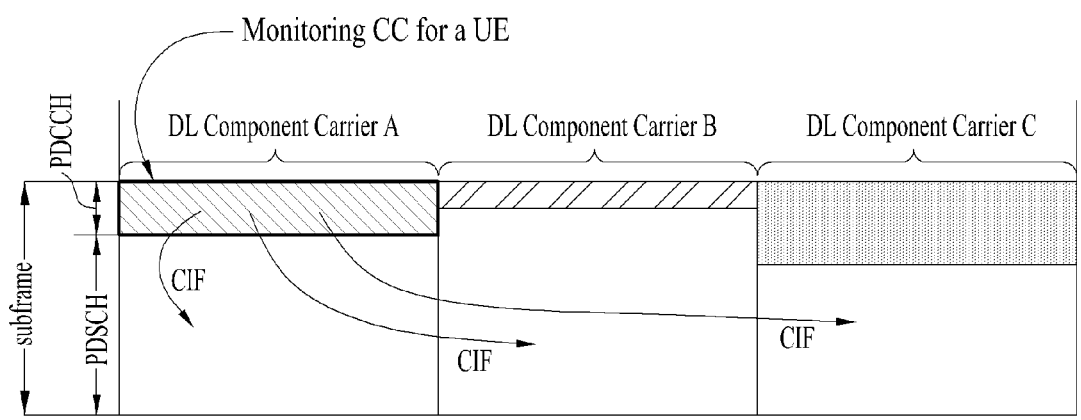
FIG. 7 illustrates a subframe structure of an LTE-A system according to cross carrier scheduling.

FIG. 7 illustrates a subframe structure of an LTE-A system according to cross carrier scheduling.

Referring to FIG. 7, a DL subframe for an LTE-A UE is formed by combining three DL CCs and a DL CC 'A' is configured as a PDCCH monitoring DL CC. When a CIF is not used, each DL CC may transmit a PDCCH for scheduling a PDSCH thereof without a CIF. On the other hand, when the CIF is used via upper layer signaling, only one DL CC 'A' may transmit a PDSCH thereof or a PDCCH for scheduling a PDSCH of another CC using a CIF. In this case, DL CCs 'B' and 'C' that are not configured as a PDCCH monitoring DL CC do not transmit PDCCH.

3. Interference Between BSs

In a cellular network-based wireless communication system, interference between homogeneous networks or heterogeneous networks is present. This interference may adversely affect a control channel as well as a data channel. Hereinafter, a method for overcoming this problem will be described.

3. 1. Allocation of Almost Blank Subframe (ABS)

A heterogeneous network/deployments refer to a structure in which micro cells for low power/short distance communication coexist in a macro cell-based homogeneous network. A macro cell (or a macro BS) is a general cell (or BS) of a wireless communication system and has wide coverage and high transmission power. In addition, a micro cell (or a micro cell) is a small version of the macro cell and can independently operate while performing most of functions of the macro cell. In addition, the micro cell may be an overlay type cell (or BS) installed in a region covered by the macro cell or a non-overlay type cell (or BS) installed in a shadow region that cannot be covered by the macro cell. The micro cell can accommodate a small number of UEs with narrow coverage and low transmission power compared with the macro cell. The micro cell may be referred to as a pico cell, a femto cell, hom evolved node B (HeNB), a relay, etc.

A UE may be served directly from the macro cell or may be served from the micro cell. In addition, in some cases, a UE present in coverage of the micro cell may be served from the macro cell.

According to access restriction of the UE, the micro cell can be classified into two types of cells. A first type of cell is a closed subscriber group (CSG) cell and refers to a cell that does not permit access of a conventional macro UE (a UE served from the macro cell) or another micro UE (a UE served from the micro cell) without authentication. A second type of cell is an open access subscriber group (OASC) or open subscriber group (OSC) cell and refers to a cell that permits access of a conventional macro UE or other micro UEs.

In a heterogeneous network environment in which the macro cell and the micro cell coexist, serious interference between cells may occur compared with a homogeneous network environment in which only the macro cell (or only the micro cell) exists.

Figure 8:
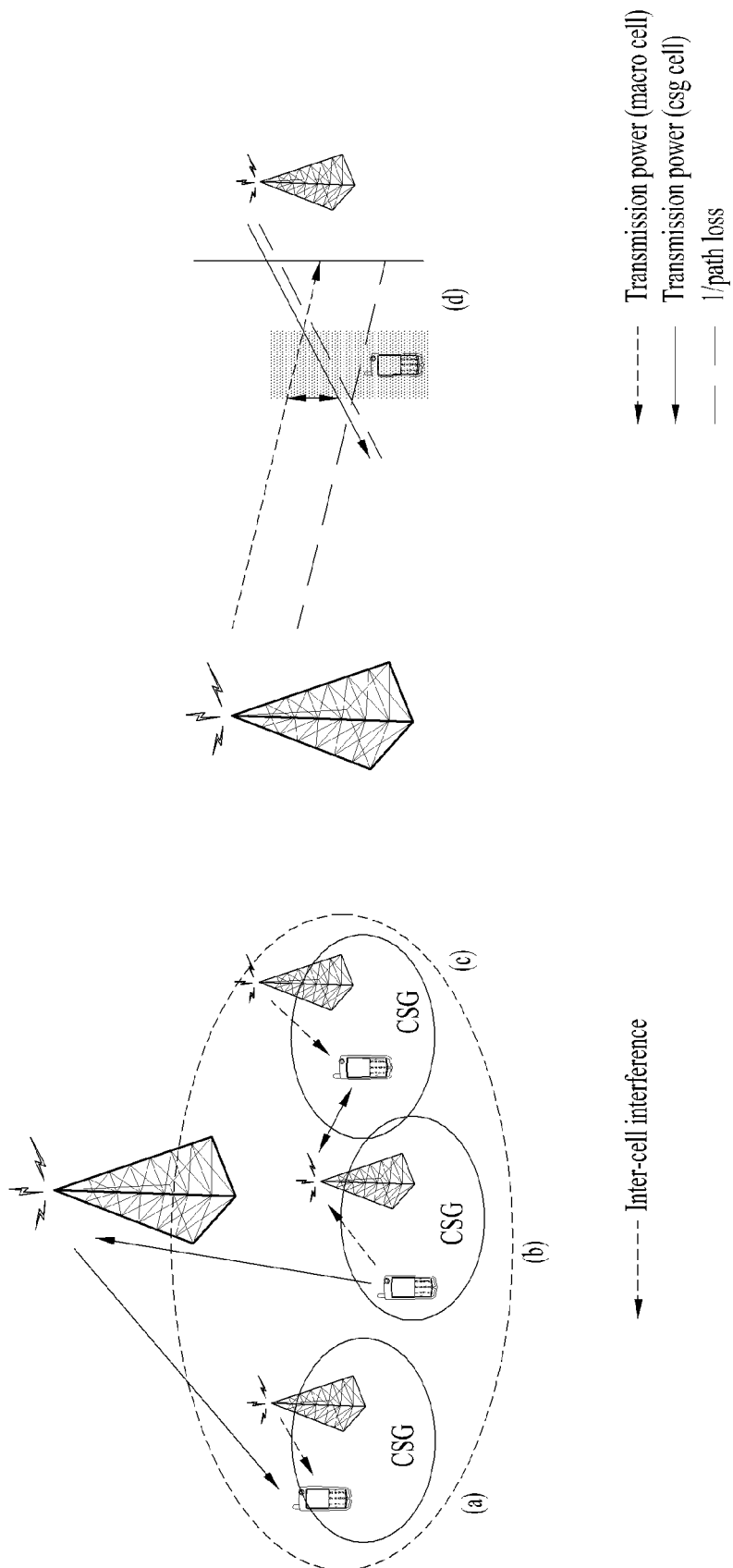
FIG. 8 is a diagram illustrating an example of interference that may occur in a heterogeneous-network wireless communication system including a macro cell and a micro cell.

FIG. 8 is a diagram illustrating an example of interference that may occur in a heterogeneous-network wireless communication system including a macro cell and a micro cell.

Referring to FIG. 8, a case a indicates an example in which a macro UE that is not permitted to access a CSG cell interferes with a HeNB. A case b indicates an example in which the macro UE seriously interferes with the HeNB. A case c indicates an example in which a CSG UE interferes with another CSG cell. A case d illustrates an example in which UL can be improved due to a path loss (e.g., due to use of deviated reference signal received power (RSRP) report) based on cell association but DL interference of a UE that is not a macro UE increasingly occurs inevitably at a cell edge.

This means that methods for control signaling of L1 (first layer)/L2 (second layer) and handling a synchronization signal and an RS as well as UL and DL interference that affects data are important. These methods may be performed in time, frequency, and/or spatial domains.

A macro-pico heterogeneous network, the macro cell may strongly interfere with a UE served from a pico cell, particularly, a UE at a boundary of a serving pico cell. The macro cell that interfere as time domain inter-cell interference coordination (ICIC) may provide a subframe called a ABS (or almost blank sub-frame (ABSF)) such that any DL control channel or data channel except for a CRS is not transmitted in the ABSF so as to protect the channel from the strong interference from the macro cell. When a primary synchronization sequence (PSS), a secondary synchronization sequence (SSS), a physical broadcast control channel (PBCH), a system information block type 1 (SIB1), paging, and positioning reference signal (PRS) correspond to the ABS, the CRS is transmitted via the ABS. In addition, when the ABS corresponds to a positioning reference signal (MBSFN) subframe that does not transmit any signal in a data region, the CRS is not transmitted in th data region of the ABS.

Figure 9:
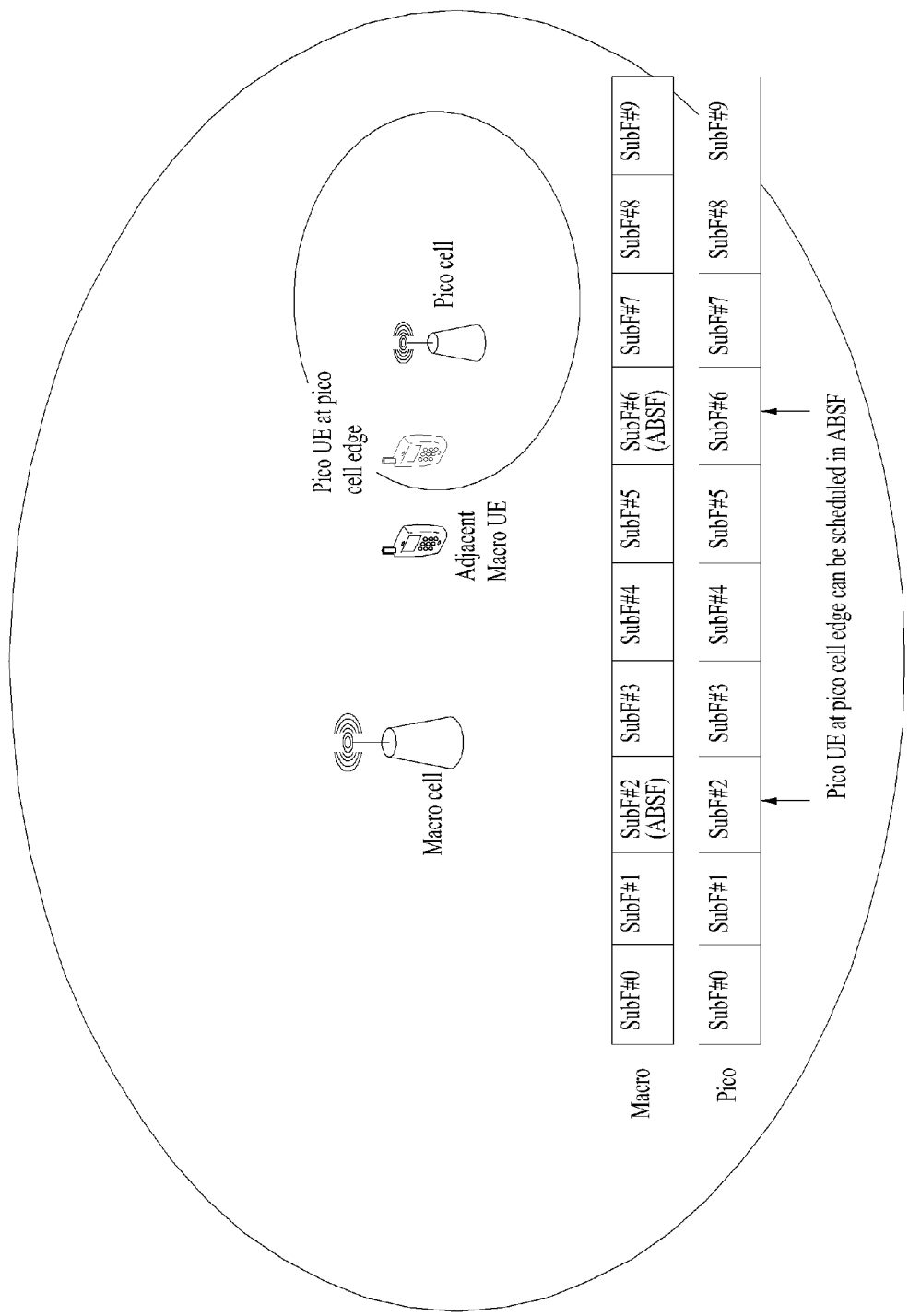
FIG. 9 is a diagram of an example of ABS structure in a macro cell in a macro-pico network.

FIG. 9 is a diagram of an example of ABS structure in a macro cell in a macro-pico network.

Referring to FIG. 9, the macro cell may configure a subframe having indexes #2 and #6 as an ABSF. This information may be indicated to a pico cell via backhaul. The pico cell may schedule a pico UE (a UE served from the pico cell), particularly, UEs at a boundary between the macro cell and the pico cell only in the ABSF based on information received from the macro cell. That is, the pico UE may perform CSI measurement only in ABSFs.

The interfered UE is configured to perform measurement for radio link monitoring (RLM)/radio resource management (RRM) in subframe(s) limited by a serving cell for prevention of unnecessary radio linkfailure (RLF) and accurate measurement of reference signal received power (RSRP) and reference signal received quality (RSRQ). To this end, bitmap signaling having the same period as backhaul signaling (for example, 1 may indicate an ABS and 0 may indicate other subframes) may be applied and a pattern needs to be independently configured from a backhaul bitmap pattern.

Conventional ICIC technologies are not sufficient to overcome co-channel interference and thus two scenarios of a CSG scenario and a pico scenario are proposed. These scenarios are examples of a network configuration for description of the basic concept of time domain ICIC and can also be applied to another network arrangement scenario.

Figure 10:
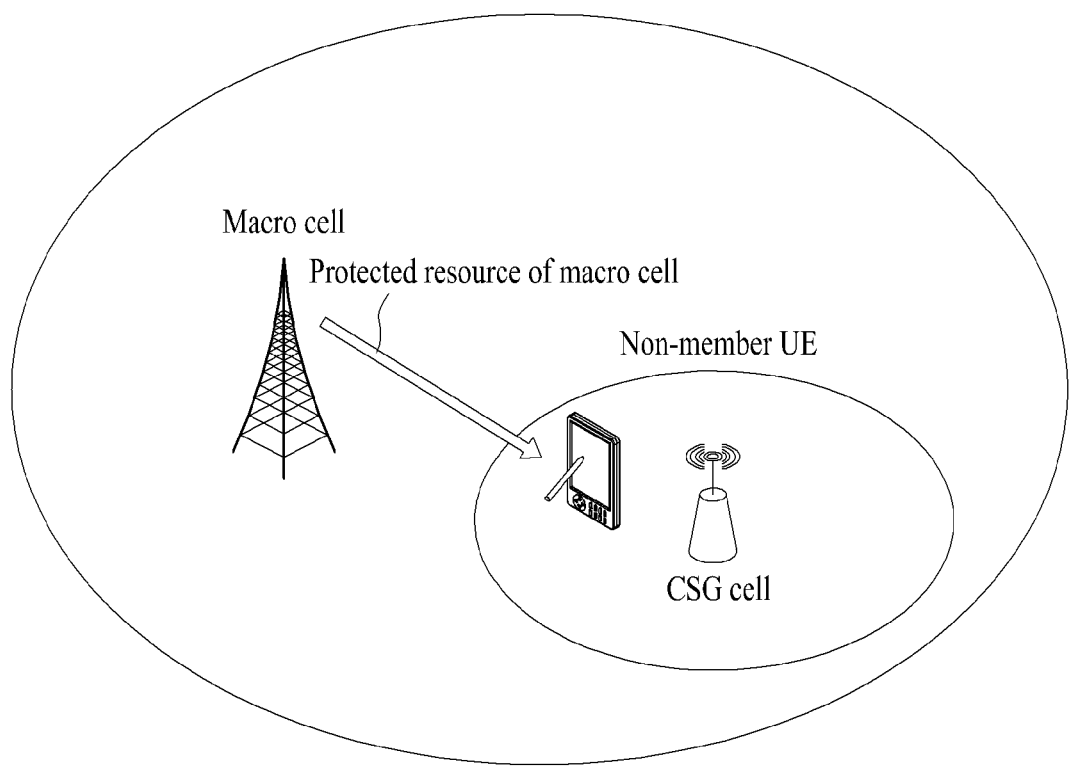
FIG. 10 illustrates a CSG scenario as time domain inter-cell interference coordination (ICIC)

FIG. 10 illustrates a CSG scenario as time domain ICIC.

Referring to FIG. 10, when a UE (hereinafter, referred to as a 'non-member UE') that is not permitted to access a CSG cell approaches the CSG cell, a main interference state may occur. According to network arrangement and strategy, it may not be possible to divert a UE that is affected by inter-cell interference to another evolved universal terrestrial radio access (E-UTRA) carrier or another radio access technology (RAT) carrier. The time domain ICIC may be used to permit the non-member UE to receive a service from a macro cell in the same frequency layer.

The CSG cell may use an ABSF in order to protect a subframe of a corresponding macro cell from interference so as to alleviate this interference. The non-member UE may be signaled to use protected resources for measurement of RRM, RLM, and CSI for a serving macro cell and permitted to be continuously served from the macro cell under strong interference from the CSG.

In an RRC_CONNECTED state, a network may discover that the non-member UE is associated with strong interference from the CSG cell through measurement events defined in, for example, LTE Release-8/9 and may be configured to limit RRM/RLM/CSI resources for the UE. In addition, the network may be configured to limit RRM measurement resources for a neighboring cell in order to facilitate mobility from a serving macro cell. The network may release limitation of RRM/RLM/CSI measurement resources upon detecting that the UE does not strongly interfere with the CSG cell any more.

Figure 11:
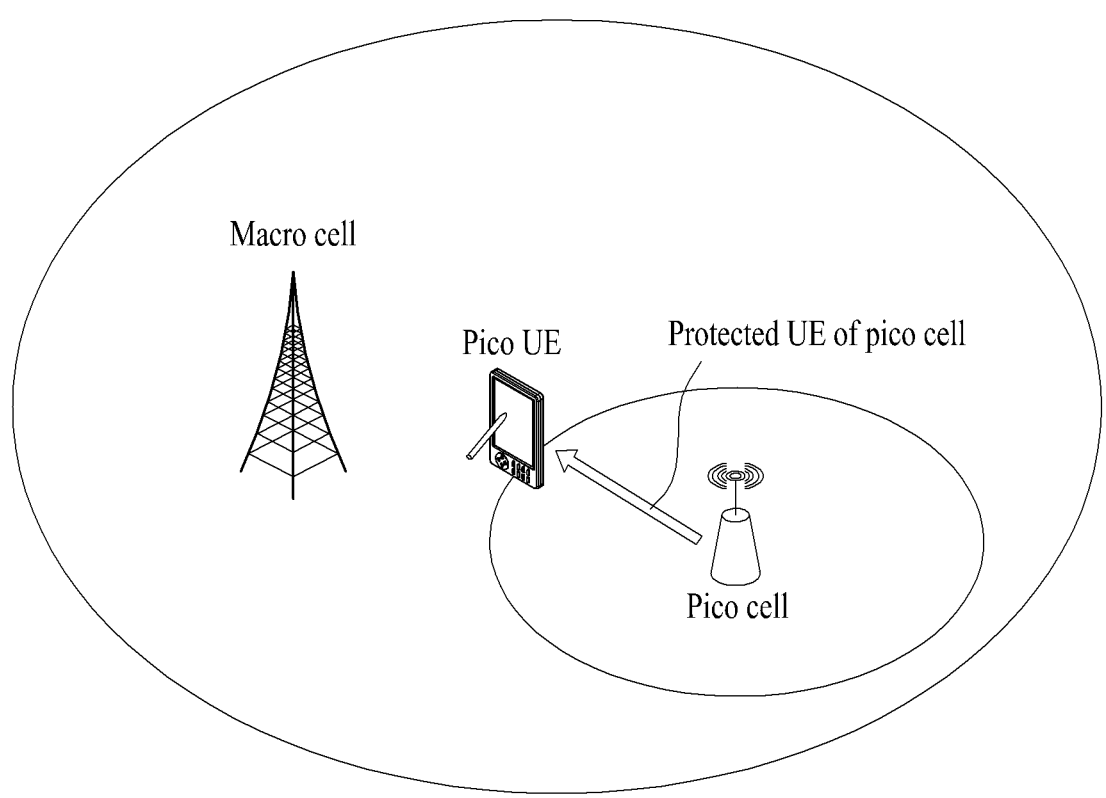
FIG. 11 illustrates a pico scenario as time domain ICIC.

FIG. 11 illustrates a pico scenario as time domain ICIC.

Referring to FIG. 11, the time domain ICIC may be used for a pico UE (e.g., an off-loaded UE to a pico cell from a macro cell) at a boundary of a serving pico cell. The time domain ICIC may be used to permit the above UE to receive a service from the pico cell in the same frequency layer. The macro cell may use an ABSF in order to protect a subframe of a corresponding pico cell from interference so as to alleviate this interference. The pico UE (a UE served from the pico cell) may use protected resources for measurement of RRM, RLM, and CSI for a serving pico cell. For the pico UE, limitation in RRM/RLM/CSI measurement resources may facilitate more accurate measurement of the pico cell under strong interference from the macro cell. The pico cell may be configured to selectively limit RRM/RLM/CSI measurement resources for only UEs associated with strong interference from the macro cell. In addition, for a UE that receives a service from the macro cell, the network may be configured to limit RRM measurement resources for a neighboring cell in order to facilitate mobility to the pico cell from the macro cell.

A method of transmitting information regarding a subframe pattern (e.g., an ABS pattern) between cells will be described below in detail.

An aggressor cell may signal two bitmaps to a victim cell via an X2 interface. Each bitmap may have a 40 bit size and may express the attribute of each subframe in units of 40 subframes. A first bitmap indicates a subframe in which an ABS is positioned. That is, the first bitmap may correspond to a bitmap that represents 1 as the ABS and 0 as other subframes. A second bitmap may correspond to a bitmap of the first bitmap, which represents a subframe to be configured as the ABS with high probability. That is, a subframe that needs to be configured as the ABS in the second bitmap may correspond to a subset of the subframe configured as the ABS in the first bitmap. The subset may be used in a receiver end for configuration of limited RLM/RRM measurement. The serving cell indicates actual resources for RLM/RRM and CSI via RRC signaling.

The macro cell uses a bitmap pattern in order to indicate the ABS pattern to the pico cell. A period of the bitmap pattern is 40 ms in an FDD system. In a TDD system, the period may be 20 ms in UL-DL configurations 1 to 5, 70 ms in a UL-DL configuration 0, and 60 ms in a UL-DL configuration 6.

The bitmap pattern may be semi-statically updated. In this case, update trigger may be aperiodically generated and may be generated based on an event.

3. 2. Exchange in Scheduling Information Between BSs

As described above, in order to alleviate interference between BSs, an LTE/LTE-A system may allocate an ABS in order to alleviate interference of a data channel (PDSCH) so as to allow a victim cell to receive signals without interference.

In addition to this method, a frequency domain allocated to each UE at cell edge may be orthogonally allocated using scheduling information between BSs.

Figure 12:
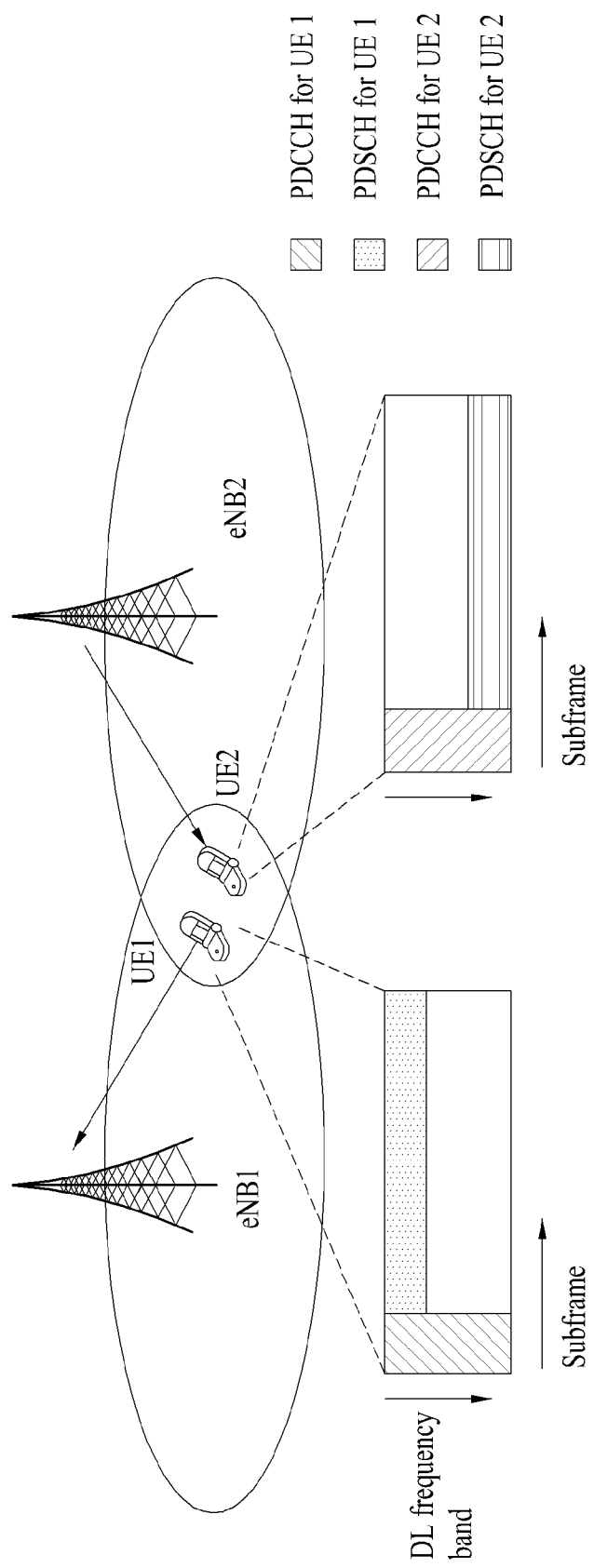
FIG. 12 is a diagram illustrating a scheme for exchanging scheduling information between BSs to alleviate interference.

FIG. 12 is a diagram illustrating a scheme for exchanging scheduling information between BSs to alleviate interference.

FIG. 12 illustrates a case in which a BS eNB 1 transmits a PDCCH and a PDSCH to a UE and a BS 2 eNB 2 transmits a PDCCH and a PDSCH to a UE 2. In this case, the BSs eNB 1 and eNB 2 may exchange scheduling information between the BSs eNB 1 and eNB 2 and allocate a PDSCH to the UEs 1 and 2 at a cell edge in respective orthogonal frequency domains to alleviate interference. Since the PDCCH for the UEs 1 and 2 is transmitted in an entire DL frequency bandwidth, problems may arise in that interference cannot be alleviated using this scheme for exchanging the scheduling information between BSs.

In addition, interference may also occur in case of different UL/DL configurations between BSs.

Figure 13:
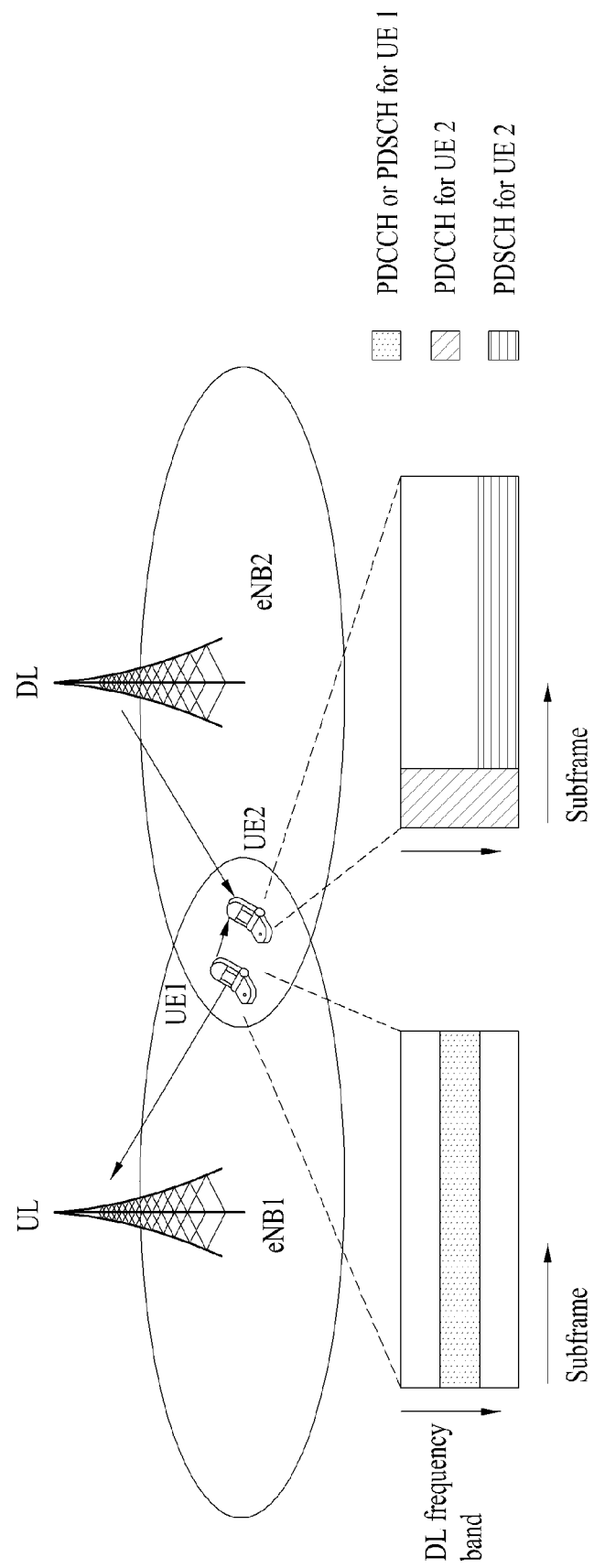
FIG. 13 is a diagram of an example of a scheme for exchanging scheduling information between BSs to alleviate interference in case of different UL/DL configurations between BSs.

FIG. 13 is a diagram of an example of a scheme for exchanging scheduling information between BSs to alleviate interference in case of different UL/DL configurations between BSs.

FIG. 12 illustrates a case in which a BS eNB 1 receives a PUCCH or a PUSCH from a UE 1 and a BS 2 eNB 2 transmits a PDCCH and a PDSCH to a UE 2. In this case, the PUCCH or PUSCH transmitted from the UE 1 may act as interference with respect to the PDCCH and PDSCH that need to be transmitted by the adjacent UE 2. In this case, when scheduling information between the BSs eNB 1 and eNB 2 is exchanged, interference with respect to the PDSCH transmitted to the UE 2 may be alleviated by allocating the UEs 1 and 2 to respective orthogonal frequency domains. That is, the interference may be alleviated by allocating the PUCCH or PUSCH transmitted to the BS 1 eNB 1 from the UE 1 and the PDSCH transmitted to the UE 2 from the BS 2 eNB 2 to the respective orthogonal frequency domains. However, as described above, since the PDCCH transmitted to the UE 2 is transmitted in an entire DL frequency bandwidth, the PDCCH may be affected by interference due to the PUCCH or PUSCH transmitted from the UE 1.

Likewise, control channels (a PDCCH, a PCFICH, or a PHICH) can be transmitted in all subframes and allocated and transmitted in an entire DL bandwidth. Thus, it is difficult to prevent interference. Thus, there is a need for a technology for alleviating or preventing interference with respect to a control channel.

In order to overcome this problem, the present invention proposes a cross subframe scheduling method and an indication method for the same.

4. Cross Subframe Scheduling

Cross subframe scheduling refers to a scheme for transmitting a PDCCH of a subframe that is strongly affected by interference between the homogeneous BSs or heterogeneous BSs in a PDCCH region of a subframe that is less affected by interference. In this case, affection of interference between subframes may differ due to a difference in scheduling load and transmission power of an aggressor cell or different UL-DL configurations between adjacent BSs.

FIG. 14 is a schematic diagram illustrating the concept of cross subframe scheduling according to an embodiment of the present invention.

FIG. 14(*a*) illustrates cross subframe scheduling when a single cell is configured. FIG. 14(*b*) illustrates cross subframe scheduling when a multi-cell is configured in a carrier aggregation environment. Each cell is exemplified as 10 subframes and a number indicated in each subframe indicates an index of the corresponding subframe.

FIG. 14(*a*) illustrates a case in which cross subframe scheduling is used when subframes #1 and #6 are largely affected by interference in case of single cell configuration. In this case, since the subframes #1 and #6 are largely affected by interference, a subframe #0 transmits a PDCCH for a subframe #1 and a subframe #4 transmits a PDCCH for the subframe #6 and thus a PDCCH may not be transmitted to each of the subframes #1 and #6. In this case, a PDCCH of the subframes #0 and #4 and a PDCCH of the subframes #1 and #6 may be transmitted together in the subframes #0 and #4. As a result, a UE may receive the PDCCH of the subframes #1 and #6 that are largely affected by interference via a subframe (each of the subframes #0 and #4) that is less affected by interference, thereby improving the reliability of PDCCH reception.

The cross subframe scheduling may be applied in the same way when a multi-cell is configured for the UE.

FIG. 14(*b*) illustrates a case in which subframes #1 and #6 are largely affected by interference in a P cell and subframes #2 and #9 are largely affected by interference in an S cell. In this case, subframes #0 and #4 of the P cell transmit PDCCHs for subframes #1 and #6, respectively and subframes #1 and #7 of the S cell transmit PDCCHs for subframes #2 and #9, respectively. Thus, subframes #1 and #6 of the P cell may not transmit a PDCCH. In FIG. 14(*b*), for convenience of description, cross cell scheduling is not performed and the P cell and the S cell perform self-scheduling. However, of course, cross cell scheduling together with the cross subframe scheduling can be applied (or supported).

Figure 15:
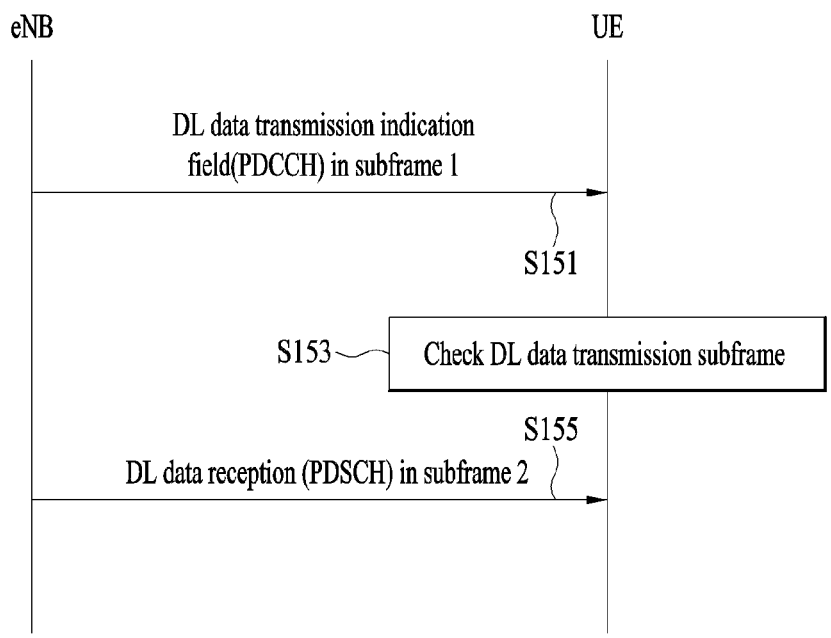
FIG. 15 is a diagram illustrating cross subframe scheduling on a DL data channel, according to an embodiment of the present invention.

FIG. 15 is a diagram illustrating cross subframe scheduling on a DL data channel, according to an embodiment of the present invention.

Referring to FIG. 15, a BS transmits a PDCCH containing a field value indicating a subframe for transmission of DL data to a UE (S151).

The UE that receives the PDCCH from the BS checks a subframe for transmission of a PDSCH (i.e., a PDSCH according to DL grant information contained in the PDCCH) associated with the received PDCCH based on the field value contained in the received PDCCH (S153). In this case, the UE may also check a subframe for transmission of the PDSCH associated with the PDCCH received in S151 using information configured via upper layer signaling (e.g., RRC signaling). The field value contained in the PDCCH or the information configured via the upper layer signaling may contain information regarding a cell for transmission of the PDSCH.

Then the UE that checks the subframe for transmission of the PDSCH may receive the DL data transmitted via the PDSCH in the corresponding subframe (S155).

For example, in legacy LTE-A release-8/9/10, when the UE detects a PDCCH transmitted from the BS in an nth subframe, the UE detects (or demodulates) a PDSCH in the corresponding subframe assuming a PDSCH associated with detected PDCCH is transmitted in an (n+k)th subframe. Here, k=0 is satisfied. That is, the PDCCH and the PDSCH are transmitted in the same subframe.

However, according to the cross subframe scheduling of the present invention, when the UE detects the PDCCH transmitted thereto in an nth subframe, the UE detects (or demodulates) a PDSCH in a corresponding subframe assuming that the associated PDSCH is transmitted in an (n+k+m)th subframe (m>0).

In FIG. 15, for convenience of description, a PDCCH is exemplified. However, a case in which a HARQ ACK/NACK is transmitted on the PHICH can be applied in the same way. That is, when the PHICH is transmitted in an nth subframe, the UE may detect the PDSCH in a corresponding subframe assuming that a PDSCH associated with the corresponding PHICH is transmitted in an (n+k+m)th subframe (m>0).

Figure 16:
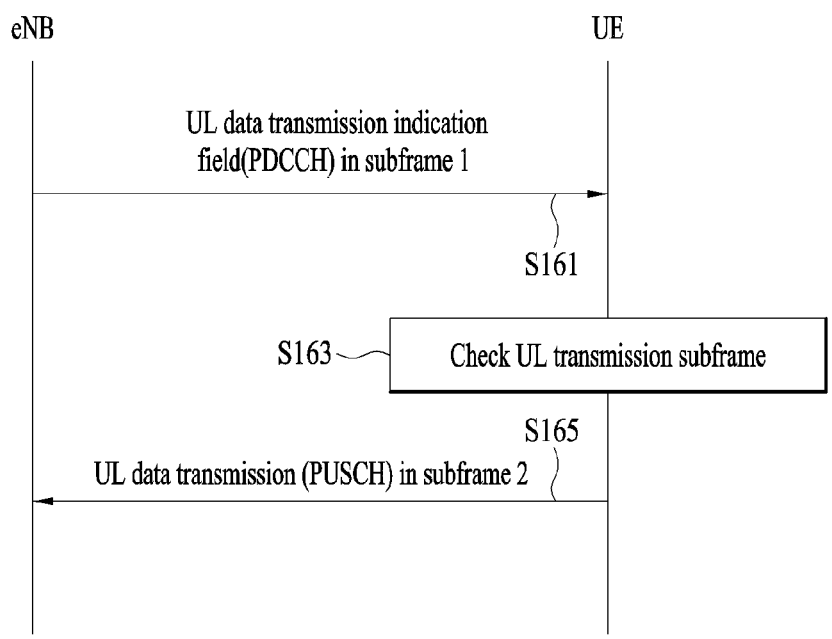
FIG. 16 is a diagram illustrating cross subframe scheduling on a UL data channel according to an embodiment of the present invention.

FIG. 16 is a diagram illustrating cross subframe scheduling on a UL data channel according to an embodiment of the present invention.

Referring to FIG. 16, a BS transmits a PDCCH containing a field value indicating a subframe for transmission of UL data to a UE (S 161).

The UE that receives the PDCCH from the BS checks a subframe for transmission of a PUSCH (i.e., a PUSCH according to UL grant information contained in the PDCCH) associated with the received PDCCH based on the field value contained in the received PDCCH (S163). In this case, the UE may also check a subframe for transmission of the PUSCH associated with the PDCCH received in S161 using information configured via upper layer signaling (e.g., RRC signaling). The field value contained in the PDCCH or the information configured via the upper layer signaling may contain information regarding a cell for transmission of the PUSCH.

Then the UE that checks the subframe for transmission of the PUSCH transmits UL data to the BS on the PUSCH in the corresponding subframe (S165).

For example, in legacy LTE-A release-8/9/10, when the UE detects a PDCCH transmitted from the BS in an nth subframe, the UE transmits a PUSCH associated with detected PDCCH in an (n+k)th subframe. Here, in an FDD system, k is 4. In a TDD system, k may have different values according to the TDD UL-DL configuration described in Table 2 and an index (or number) of a subframe for reception of a PDCCH in a frame. That is, PUSCH transmission timing (k) is determined according to a number of a subframe for reception of the PDCCH in a frame according to the TDD UL-DL configuration and thus a PUSCH associated with the PDCCH is transmitted in an (n+k)th subframe according to the transmission timing (k).

However, according to the cross subframe scheduling of the present invention, when the UE detects the PDCCH transmitted thereto in an nth subframe, the UE transmits an associated PUSCH in an (n+k+m)th subframe (m>0). That is, the BS detects (or demodulates) a corresponding PUSCH assuming that a PUSCH is transmitted in an (n+k+m)th subframe (m>0).

In FIG. 16, for convenience of description, a PDCCH is exemplified. However, a case in which a HARQ ACK/NACK is transmitted on a PHICH can be applied in the same way. That is, when the PHICH is transmitted in an nth subframe, the UE may transmit a PUSCH associated with the corresponding PHICH in an (n+k+m)th subframe (m>0) and the BS may detect a PUSCH in an (n+k+m)th subframe (m>0).

In order to facilitate the cross subframe scheduling, a position of a subframe of a scheduled PDSCH (or PUSCH) may be indicated via a PDCCH or upper layer signaling (RRC signaling). In this case, the position of the PDSCH (or the PUSCH) subframe may be known as a subframe index that is an absolute value or as a relative subframe position based on a scheduled PDCCH. A technology for transmitting this indication information to the UE and demodulating a PDCCH will be described below.

According to an embodiment of the present invention, a PDCCH may refer to a DCI format containing UL grant information or a DCI format containing DL grant information. The present invention can be applied without limitation in a format of the PDCCH. Hereinafter, according to embodiments of the present invention, for convenience of description, cross subframe scheduling on a PDCCH and a PDSCH is exemplified. However, the present invention can be applied in the same way to cross subframe scheduling on a PDCCH and a PUSCH. In addition, a PDCCH and a PDSCH that will be described later refer to a PDCCH and a PDSCH that are associated with each other. However, for convenience of description, a PDCCH and a PDSCH will be simply used.

4. 1. Use of Carrier Indication Field (CIF) Reserved Bit

A BS may transmit indication to a UE using a CIF reserved bit in a PDCCH. In this case, the CIF may be used for cross subframe scheduling and may also be used for cross cell scheduling in a system for supporting a conventional carrier aggregation environment.

4. 1. 1. Indication of Scheduled Subframe

Although a CIF in a DCI format is configured by 3 bits, a maximum value of configured cells in an LTE-A system is 5 and thus cross subframe scheduling can be supported using three reserved bits. That is, position information of a cross-subframe scheduled subframe may be indicated using the three reserved bits. For example, when a PDCCH is transmitted in an nth subframe, the position information of the subframe may be m corresponding to a case when a PDSCH is transmitted in an (n+k+m)th subframe. In this case, in an FDD system, k is 0. In a TDD system, k may have different values according to the TDD UL-DL configuration described in Table 2 and an index (or number) of a subframe for reception of a PDCCH in a frame.

When the number of cells configured for the UE is x, y positions of a cross-subframe scheduled subframe may be indicated. For example, as described above, when the CIF is configured by 3 bits, y=8−x positions of subframes may be indicated. In addition, when a bit size used for indication is n, y=$2^n$−x positions of cross-subframe scheduled subframe may be indicated.

Likewise, the position information of a subframe using cross subframe scheduling, indicated based on the CIF, may indicate m for indication a PDSCH transmitted in an (n+k+m)th subframe of a PDCCH transmitted an nth subframe or may be a parameter for induction of m.

Table 7 below shows a cross subframe scheduling configuration method using a CIF. Table 7 below shows an example in which 0 to 4 of CIF values are used as ServCellIndex and 5 to 7 are used to indicate a position of a cross-subframe scheduled subframe.

TABLE 7

| CIF value | Bit format | contents |
|---|---|---|
| 0 | 000 | ServCellIndex 0 |
| 1 | 001 | ServCellIndex 1 |
| 2 | 010 | ServCellIndex 2 |

TABLE 7-continued

| CIF value | Bit format | contents |
|---|---|---|
| 3 | 011 | ServCellIndex 3 |
| 4 | 100 | ServCellIndex 4 |
| 5 | 101 | 1 subframe later(or delay) (e.g., m = 1) |
| 6 | 110 | 2 subframes later(or delay) (e.g., m = 2) |
| 7 | 111 | 3 subframes later(or delay) (e.g., m = 3) |

As shown in Table 7 above, when a CIF value contained in a DCI transmitted on a PDCCH is 5, the PDCCH indicates a PDCCH for a PDSCH transmitted in an immediately next (n+k+m)th subframe (k=0 and m=1) with respect to an nth subframe for reception of the corresponding PDCCH. In addition, when a CIF value contained in a DCI transmitted on a PDCCH is 6, the PDCCH indicates a PDCCH for a PDSCH transmitted in a second next (n+k+m)th subframe (k=0 and m=2) with respect to the nth subframe for reception of the corresponding PDCCH. In addition, 7 indicates a PDCCH for a PDSCH transmitted in a third next (n+k+m)th subframe (k=0 and m=3).

As another example, Table 8 below shows a cross subframe scheduling configuration method using a CIF. Table 7 below shows an example in which 0 to 3 of CIF values are used as ServCellIndex and 4 to 7 are used to indicate a position of a cross-subframe scheduled subframe.

TABLE 8

| CIF value | Bit format | contents |
|---|---|---|
| 0 | 000 | ServCellIndex 0 |
| 1 | 001 | ServCellIndex 1 |
| 2 | 010 | ServCellIndex 2 |
| 3 | 011 | ServCellIndex 3 |
| 4 | 100 | 1 subframe later(or delay) (e.g., m = 1) |
| 5 | 101 | 2 subframes later(or delay) (e.g., m = 2) |
| 6 | 110 | 3 subframes later(or delay) (e.g., m = 3) |
| 7 | 111 | 4 subframes later(or delay) (e.g., m = 4) |

As seen from Table 8 above, a CIF value indicating position information of the cross-subframe scheduled subframe is added compared with Table 7 above. In Table 7 above, CIF values 5 to 7 correspond to CIFs 4 to 6 of Table 8 above, respectively. When a CIF value contained in a DCI transmitted on a PDCCH is 7, the PDCCH indicates a PDCCH for a PDSCH transmitted in a fourth next (n+k+m)th subframe (k=0 and m=4) with respect to an nth subframe for reception of the corresponding PDCCH.

As another example, Table 9 below shows a cross subframe scheduling configuration method using a CIF. Table 9 below shows an example in which 0 to 4 of CIF values are used as ServCellIndex and 5 to 7 are used to indicate a position of a cross-subframe scheduled subframe.

TABLE 9

| CIF value | Bit format | contents |
|---|---|---|
| 0 | 000 | ServCellIndex 0 |
| 1 | 001 | ServCellIndex 1 |
| 2 | 010 | ServCellIndex 2 |
| 3 | 011 | ServCellIndex 3 |

TABLE 9-continued

| CIF value | Bit format | contents |
|---|---|---|
| 4 | 100 | ServCellIndex 4 |
| 5 | 101 | 0 subframe later(or delay) = no delay(or current subframe) (e.g., m = 0) |
| 6 | 110 | 1 subframe later(or delay) (e.g., m = 1) |
| 7 | 111 | 2 subframes later(or delay) (e.g., m = 2) |

As shown in Table 9 above, when a CIF value contained in a DCI transmitted on a PDCCH is 5, the corresponding PDCCH indicates a PDCCH (n+k+m, k=0, m=0) to which cross cell scheduling is not applied. In addition, when a CIF value contained in a DCI transmitted on a PDCCH is 6, the PDCCH indicates a PDCCH for a PDSCH transmitted in a first next (n+k+m)th subframe (k=0 and m=1) with respect to an nth subframe for reception of the corresponding PDCCH. 7 indicates a PDCCH for a PDSCH transmitted in a second next (n+k+m)th subframe (k=0 and m=2).

As another example, Table 10 below shows a cross subframe scheduling configuration method using a CIF. Table 10 below shows an example in which 0 to 3 of CIF values are used as ServCellIndex and 4 to 7 are used to indicate a position of a cross-subframe scheduled subframe.

TABLE 10

| CIF value | Bit format | contents |
|---|---|---|
| 0 | 000 | ServCellIndex 0 |
| 1 | 001 | ServCellIndex 1 |
| 2 | 010 | ServCellIndex 2 |
| 3 | 011 | ServCellIndex 3 |
| 4 | 100 | 0 subframe later(or delay) = no delay(or current subframe) (e.g., m = 0) |
| 5 | 101 | 1 subframe later(or delay) (e.g., m = 1) |
| 6 | 110 | 2 subframes later(or delay) (e.g., m = 2) |
| 7 | 111 | 3 subframes later(or delay) (e.g., m = 3) |

As seen from Table 10 above, a CIF value indicating position information of the cross-subframe scheduled subframe is added compared with Table 9 above. In Table 9 above, CIF values 5 to 7 correspond to CIFs 4 to 6 of Table 10 above, respectively. When a CIF value contained in a DCI transmitted on a PDCCH is 7, the PDCCH indicates a PDCCH for a PDSCH transmitted in a third next (n+k+m)th subframe (k=0 and m=3) with respect to an nth subframe for reception of the corresponding PDCCH.

Tables 7 through 10 above show an example of indicating a relative position of a subframe for transmission of a PDSCH based on a subforme for reception of a PDCCH. However, CIF content may be configured so as to indicate a specific subframe in a radio frame without a relative value (for example, to indicate an index provided to each subframe included in a radio frame).

Likewise, in a wireless access system for supporting a multi-cell (or carrier aggregation) environment, when the aforementioned cross subframe scheduling is performed, a position of a cell where a cross-subframe scheduled subframe is positioned may be determined using the following method.

4. 1. 1. 1. Self-Scheduling

A cross-subframe scheduled subframe using a CIF value in a multi-cell (or carrier aggregation) environment may be positioned in a cell for reception of a corresponding PDCCH. That is, a PDCCH containing the cross subframe scheduling information may be used for self scheduling on a cell for reception of a PDCCH. In this case, when a CIF indicates cross subframe scheduling. carrier indication may implicitly have 0 and may explicitly indicate an index of a cross-subframe scheduled cell (a cell for reception of a PDCCH).

Figure 17:
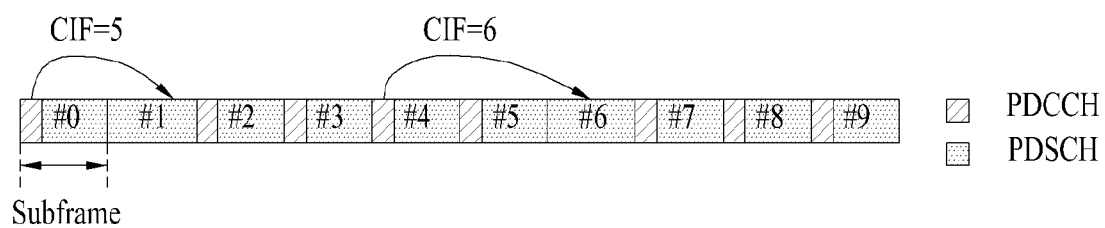
FIG. 17 is a diagram of a cross subframe scheduling method according to an embodiment of the present invention.

FIG. 17 is a diagram of a cross subframe scheduling method according to an embodiment of the present invention. FIG. 17 illustrates a case using Table 7 above for the cross subframe scheduling.

Referring to FIG. 17, a PDCCH containing cross subframe scheduling information may be used for self scheduling on a cell for transmission of a PDCCH. Thus, a PDCCH with CIF=5, transmitted in the subframe #0, may indicate the subframe #1 of a corresponding cell for transmission of the PDCCH. A PDCCH with CIF=6 in the subframe #4 may indicate the subframe #6 of a corresponding cell for transmission of the PDCCH.

4. 1. 1. 2. Pre-Indication of Serving Cell Index

When a CIF is used for cross subframe scheduling, a scheduled cell index (or carrier indication) may be predetermined, which may be performed via upper layer signaling, for example, an RRC configuration. In detail, when a cell index for cross subframe scheduling is configured in a specific P cell or S cell, a subframe indicated by a CIF refers to a cross-subframe scheduled subframe in a corresponding cell configured for cross cell scheduling. Thus, the cross subframe scheduling using the CIF may be simultaneously performed with the cross cell scheduling. For example, when a PDCCH is transmitted in an nth subframe, cross subframe scheduling information indicated by the CIF may indicate m for indication a PDSCH transmitted in an (n+k+m)th subframe of a cell configured via upper layer signaling or may be a parameter for induction of m.

Figure 18:
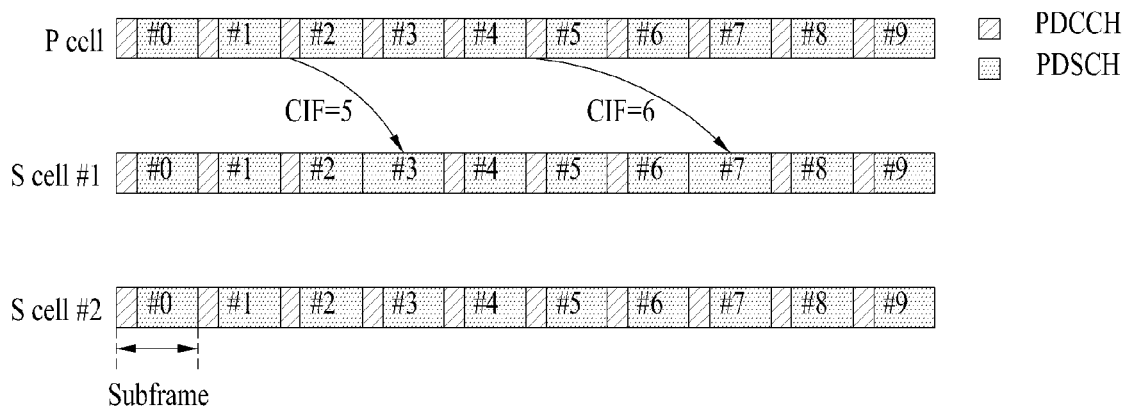
FIG. 18 is a diagram illustrating a cross subframe scheduling method according to an embodiment of the present invention.

FIG. 18 is a diagram illustrating a cross subframe scheduling method according to an embodiment of the present invention. FIG. 18 illustrates a case using Table 7 above for the cross subframe scheduling when cross-cell scheduled cell index (or carrier indication) is configured as an S cell #1.

Referring to FIG. 18, a PDCCH with a CIF=5, transmitted in a subframe #2 of a P cell, indicates a subframe #3 in an S cell #1 and a PDCCH with a CIF=6, transmitted in a subframe #5 of a P cell, indicates a subframe #7 of an S cell #1.

4. 1. 1. 3. Pre-Indication of Subframe Index

Unlike the aforementioned embodiment, when a CIF is used for cross cell scheduling, a scheduled subframe (or subframe index) may be predetermined, which may be performed via upper layer signaling, for example, an RRC configuration. In detail, when a subframe for cross subframe scheduling is configured as a specific subframe in one radio frame or is configured to have a difference with a subframe for reception of a corresponding PDCCH by as much as a predetermined number, the CIF may refer to ServCellIndex at which cross subframe scheduling is performed. Thus, the cross subframe scheduling using the CIF may be simultaneously performed with the cross cell scheduling. For example, when a PDCCH is transmitted in an nth subframe, cross subframe scheduling information indicated via an RRC configuration may indicate m for indication a PDSCH transmitted in an (n+k+m)th subframe or may be a parameter for induction of m.

In this case, a PDCCH having some specific values of CIF values may indicate a PDCCH used for cross cell scheduling. A PDCCH having other CIF values may indicate a PDCCH for cross subframe scheduling in a cell (cross-cell scheduled cell) indicated by the CIF value. That is, a subframe index for cross subframe scheduling, configured via upper layer signaling, may be used touger with cross cell scheduling when the index has only a specific value among all CIF values.

Figure 19:
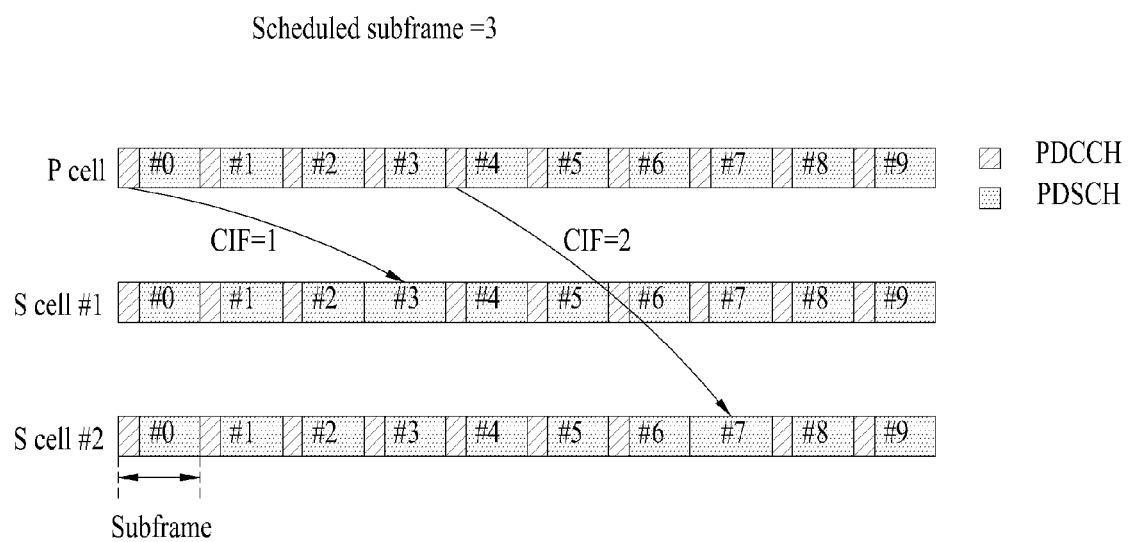
FIG. 19 is a diagram illustrating a cross subframe scheduling method according to an embodiment of the present invention.

FIG. 19 is a diagram illustrating a cross subframe scheduling method according to an embodiment of the present invention. FIG. 19 illustrates a case in which a cross-subframe scheduled subframe is configured to be indicated by three (n+k+m) subframes (k=0 and m=3) after a subframe n for reception of a PDCCH.

Referring to FIG. 19, a PDCCH with a CIF=1, transmitted in a subframe #0 of a P cell, indicates a subframe #3 of an S cell #1 and a PDCCH with a CIF=2, transmitted in a subframe #4 of the P cell, indicates a subframe #7 of the S cell #2.

4. 1. 2. Scheduled Cell and Subframe Indication

As described above, although a CIF in a DCI format is configured by 3 bits, a maximum value of configured cells in an LTE-A system is 5 and thus cross subframe scheduling can be supported using three reserved bits. That is, position information of a cross-subframe scheduled subframe may be indicated using the three reserved bits. However, unlike in the above example, according to an embodiment of the present invention, a serving cell index of a cell on which cross-subframe scheduling is performed as a basic function of a CIF may be additionally determined together with the position information of the cross-subframe scheduled subframe.

Hereinafter, the meaning of configuration of the CIF refers to the meaning of supporting of cross cell scheduling. That is, this means that a scheduling cell may be the same as or different from a scheduled cell according to a CIF. On the other hand, the meaning of non-configuration of the CIF refers to the meaning of non-supporting of cross cell scheduling. That is, this means that the scheduled cell and the scheduling cell are the same and thus CIF interpretation is not required and a CIF field may not be transmitted.

4. 1. 2. 1. When Whether CIF is Configured is not Considered

A conventional CIF is used for cross cell scheduling and thus cross subframe scheduling is performed using only a reserved bit (or non-used bit) of a CIF field irrespective of whether a CIF is configured so as not to affect cross cell scheduling. In this case, information transmitted to a UE using the CIF includes a serving cell index for cross cell scheduling as well as position information of a subframe for cross subframe scheduling. Here, the position of the subframe may be m corresponding to a case when a PDSCH is transmitted in an (n+k+m)th subframe if a PDCCH is transmitted in an nth subframe. In addition, the position information (e.g., m of n+k+m) of the subframe may be configured to apply the same value to all cross subframe scheduling without any special indication or indicated via upper layer signaling (e.g., an RRC configuration). In this case, when m is indicated via the upper layer signaling, the same value may be indicated in all cells or different values may be indicated for respective cells.

Table 11 below shows a cross cell scheduling and cross subframe scheduling configuration method using a CIF. Table 11 below shows an example in which 0 to 4 of CIF values are used as ServCellIndex for cross cell scheduling and 5 to 7 are used to indicate ServCellIndex for cross cell scheduling and a position of a cross-subframe scheduled subframe. In Table 11 below, cross subframe scheduling is not applied to 0 to 4 of the CIF values and m=0 is satisfied.

TABLE 11

| CIF value | Bit format | contents |
| --- | --- | --- |
| 0 | 000 | ServCellIndex 0 |
| 1 | 001 | ServCellIndex 1 |
| 2 | 010 | ServCellIndex 2 |
| 3 | 011 | ServCellIndex 3 |
| 4 | 100 | ServCellIndex 4 |
| 5 | 101 | ServCellIndex 0 & 1 subframe later(or delay) (e.g., m = 1) |
| 6 | 110 | ServCellIndex 1 & 1 subframe later(or delay) (e.g., m = 1) |
| 7 | 111 | ServCellIndex 2 & 1 subframe later(or delay) (e.g., m = 1) |

Referring to Table 11 above, when a CIF value is 5, 6, or 7, the CIF value indicates ServCellIndex for cross cell scheduling and m for indicating a cross-subframe scheduled subframe. In detail, when a CIF value contained in a DCI transmitted on a PDCCH is 5, the CIF value indicates a PDSCH transmitted with one subframe delay based on an nth subframe received on the corresponding PDCCH in a cell having ServCellIndex 0. In addition, when a CIF value contained in a DCI transmitted on a PDCCH is 6, the CIF value indicates a PDSCH transmitted with one subframe delay based on an nth subframe received on the corresponding PDCCH in a cell having ServCellIndex 1. In addition, when a CIF value contained in a DCI transmitted on a PDCCH is 7, the CIF value indicates a PDSCH transmitted with one subframe delay based on an nth subframe received on the corresponding PDCCH in a cell having ServCellIndex 2.

However, according to this configuration, cross subframe scheduling cannot be applied to all cells. However, LTE-A release 10 supports five cells in reality but is designed to be optimized to support two cells. Thus, in terms of optimization of two cells, cross subframe scheduling support can be effectively achieved. In addition, time delay (e.g., m of n+k+m) of a subframe is used to prevent affection due to interference between adjacent cells and necessity of many time delay values (a plurality of m values) may be low. For example, in order to support only cross subframe scheduling with m=1, it is possible to lower PDCCH transmission at half a DL subframe. Thus, a corresponding effect may be sufficiently achieved even when cross subframe scheduling is supported by a fixed low value (e.g., one m value) only.

As another example, Table 12 below shows a cross cell scheduling and cross subframe scheduling configuration method using a CIF. Table 12 below an example in which 0 to 4 of CIF values are used as ServCellIndex for cross cell scheduling and 5 to 7 are used to indicate ServCellIndex for cross cell scheduling and a position of a cross-subframe scheduled subframe. In Table 12 below, cross subframe scheduling is not applied to 0 to 4 of the CIF values and m=0 is satisfied.

TABLE 12

| CIF value | Bit format | contents |
| --- | --- | --- |
| 0 | 000 | ServCellIndex 0 |
| 1 | 001 | ServCellIndex 1 |
| 2 | 010 | ServCellIndex 2 |
| 3 | 011 | ServCellIndex 3 |
| 4 | 100 | ServCellIndex 4 |
| 5 | 101 | ServCellIndex 0 & 1 subframe later(or delay) (e.g., m = 1) |

TABLE 12-continued

| CIF value | Bit format | contents |
|---|---|---|
| 6 | 110 | ServCellIndex 0 & 2 subframes later(or delay) (e.g., m = 2) |
| 7 | 111 | ServCellIndex 1 & 1 subframe later(or delay) (e.g., m = 1) |

Table 12 is a modified example of Table 11 above and shows an example in which cross subframe scheduling is applied up to two cells in terms of optimization. Hereinafter, it is assumed that a cell with ServCellIndex 0 is a P cell.

When three information corresponding to CIF values 5 to 7 is applied to two cells, two information of the three information may be used for a P cell and the remaining one information may be used for an S cell. On the other hand, one information may be used for the P cell and the remaining two information may be used for the S cell. Thus, it may be possible to largely adjust time delay using cross subframe scheduling in a cell in which scheduling is more actively performed.

Referring to Table 12 above, when a CIF value contained in a DCI transmitted on a PDCCH is 5, the CIF value indicates a PDSCH transmitted with one subframe delay based on an nth subframe for reception of a corresponding PDCCH in a cell with ServCellIndex 0. In addition, a CIF value contained in a DCI transmitted on a PDCCH is 6, the CIF value indicates a PDSCH transmitted with two subframe delays based on an nth subframe for reception of a corresponding PDCCH in a cell with ServCellIndex 0. In addition, when a CIF value contained in a DCI transmitted on a PDCCH is 7, the CIF value indicates a PDSCH transmitted with one subframe delay based on an nth subframe for reception of a corresponding PDCCH in a cell with ServCellIndex 1.

Like in Table 10 or 11 above, a CIF field may be effectively used to apply cross subframe scheduling irrespective of whether a CIF is configured for the UE.

In addition to the aforementioned method, an RRC configuration for cross subframe scheduling may be applied. Alternatively, only the aforementioned method may be used and an RRC configuration for cross subframe scheduling may not be applied.

4. 1. 2. 2. When Whether CIF is Configured is Considered

Like in the aforementioned embodiment, when cross subframe scheduling is applied irrespective of whether a CIF is configured, there is a limit in providing a large amount of information due to restriction of a bit number for application of the cross subframe scheduling. Thus, according to whether the CIF is configured, a CIF field for cross subframe scheduling may be configured in different ways.

When the CIF is configured, the CIF field may be configured like in the embodiment described in (4. 1. 2. 1.). That is, cross subframe scheduling may be performed using only a reserved bit (or non-used bit) of a CIF field so as not to affect cross cell scheduling.

On the other hand, when the CIF is not configured, all values (0 to 7) of the CIF field may be used to transmit information for cross subframe scheduling. For example, cross subframe scheduling may be applied like in option 1 or 2 of CIF contents shown in Table 15 below.

When the CIF is configured using this method, use of a cross subframe is restricted so as not to hinder cross cell scheduling. When the CIF is not configured, use of the CIF field for cross subframe scheduling may be extended to perform effective cross subframe scheduling.

In addition to the aforementioned method, an RRC configuration for cross subframe scheduling may be applied. Alternatively, only the aforementioned method may be used and an RRC configuration for cross subframe scheduling may not be applied.

Thus far, the cross subframe scheduling scheme using a CIF value and indication information based thereon have been exemplified. However, other CIF values other than the CIF values exemplified in the aforementioned embodiment described in (4. 1. 1.) or (4. 1. 2.) may be used for indication of cross subframe scheduling and the CIF values may be configured to indicate a position of a subframe by a CIF value used for cross subframe scheduling in different ways. For example, in Table 7 above, when a CIF value is 6, the CIF value may be configured to indicate a sixth next subframe instead of a second next subframe based on a subframe for reception of a PDCCH. In this case, the CIF value may be pre-configured cell-specifically or a position of a subframe indicated by each CIF value may be semi-statically indicated to a UE via RRC signaling.

4. 2. Definition of Subframe Indication Field (SIF)

Unlike the aforementioned method using the CIF value for cross subframe scheduling in (4. 1.), a new indication bit for cross subframe scheduling may be allocated in a PDCCH. Hereinafter, this indication bit may be referred to as a subframe indication field (SIF) or may be defined as another name.

When the SIF is configured, the UE may monitor a UE-specific space (USS) in order to decode a PDCCH. In this case, in particular, a common search space (CSS) is a region monitored by a legacy UE and UEs with different performances together. Thus, the SIF is configured for the CSS. In addition, DCI formats including the SIF may be restricted such that a PDCCH is transmitted through the SSP instead of the CCS.

That is, the UE may monitor the CCS in order to decode a PDCCH that does not contain a SIF. With regard to a serving cell in which a PDCCH is monitored, a UE in which an SIF is not configured monitors the USS for a PDCCH that does not contain a SIF. On the other hand, a UE in which an SIF is configured monitors the USS for a PDCCH containing the SIF. When a UE is configured for monitoring of the PDCCH containing the SIF according to an S cell in a serving cell other than the S cell, the UE does not monitor the PDCCH in the S cell. With regard to the serving cell in which the PDCCH is monitored, the UE monitors PDCCH candidates for at least the same serving cell. A UE configured to monitor PDCCH candidates that configure an SIF for a serving cell configured for the UE, have the same first CCE index $n_{CCE}$ (e.g., a lowest CCE index used to configure a PDCCH) in the CSS and the USS, and are CRC scrambled using C-RNTI with a common payload size may assume that only a PDCCH in the CSS is transmitted via the P cell. In addition, a UE configured to monitor PDCCH candidates that have a DCI format size in a serving cell configured for the UE and are CRC scrambled using the C-RNTI may assume that the PDCCH candidates having the DCI format size is transmitted in the USS corresponding an available SIF value according to the DCI format size through the configured serving cell. Here, the PDCCH candidates may include one or more SIF values according to the configured DCI format size.

The aforementioned SIF may be configured by one or more bits. Thus, when an SIF size is x and a bit size of the conventional DCI format is n, a bit size of a DCI format for cross subframe scheduling may have an (n+x) bit form.

4. 2. 1. When SIF is Configured by 1 Bit

When an SIF is configured by one bit, 0 may indicate or trigger non-cross-subframe scheduled (non-CSS) PDCCH and 1 may indicate or trigger a PDCCH for cross subframe scheduling. Also, the converse may be possible.

In addition, when the UE receives the PDCCH for cross subframe scheduling, the corresponding PDCCH may indicate a subframe (e.g., an immediately next subframe) at a specific position based on a subframe for reception of the PDCCH or a position of a subframe in a radio frame that is previously configured based on a BS. Alternatively, the PDCCH may semi-statically indicate, to the UE, a position o a subframe or delay information (e.g., m of n+k+m) based on a subframe n for reception of the PDCCH via RRC signaling.

4. 2. 2. When SIF is Configured by One or More Bits

When an SIF is configured by one or more bits, the SIF may contain position information (e.g., m of n+k+m) of a subframe indicated by a corresponding PDCCH as well as a bit for indicating or triggering that the PDCCH is for cross subframe scheduling. For example, when the SIF is configured by two bits, the SIF may be used to indicate delay information (e.g., m of n+k+m) based on a subframe n for reception of the PDCCH or a maximum of three subframes in a radio frame.

Table 13 below shows a cross subframe scheduling using an SIF.

TABLE 13

| SIF bits | Direct mapping method | RRC configured method |
|---|---|---|
| 00 | Non CSS | Non CSS |
| 01 | 1 subframe later(or delay) (e.g., m = 1) | 1st RRC configured parameter (e.g., number of subframe later(or delay), m) |
| 10 | 2 subframes later(or delay) (e.g., m = 2) | 2nd RRC configured parameter (e.g., number of subframe later(or delay), m) |
| 11 | 3 subframes later(or delay) (e.g., m = 3) | 3rd RRC configured parameter (e.g., number of subframe later(or delay), m) |

Table 13 above shows a direct mapping method and an RRC configured method according to an SIF bit value.

First, the direct mapping method is a scheme for acquiring position information (e.g., m of n+k+m) of a subframe that is cross-subframe scheduled using only a PDCCH received by the UE. That is, the SIF may be used to indicate next subframes (e.g., m of n+k+m) based on a subframe n for reception of the PDCCH or to indicate a specific subframe or delay information of the subframe in one radio frame. In detail, when an SIF bit value contained in a DCI transmitted on the PDCCH is 00, this indicates that cross subframe scheduling is not performed. When an SIF bit value contained in a DCI transmitted on the PDCCH is 01, 10, or 11, this indicates a PDSCH transmitted with one, two, or three subframe delays based on the nth subframe received on the corresponding PDCCH.

In addition, for semi-static management, the RRC configured method may be used. That is, position or delay information (e.g., m of n+k+m) of a subframe indicated by the SIF may refer to a subframe or delay information (e.g., m of n+k+m) of the subframe, configured via RRC signaling. In detail, when an SIF bit value contained in a DCI transmitted on the PDCCH is 00, this means that cross subframe scheduling is not performed. When a SIF bit value transmitted via RRC signaling is 01, the corresponding PDCCH indicates a PDSCH in a subframe transmitted after a first RRC configuration parameter m transmitted via RRC signaling based on the receive nth subframe. In addition, when an SIF bit value transmitted via RRC signaling is 10 and 11, each corresponding PDCCH indicates a PDSCH in a subframe transmitted after second and third RRC configuration parameter m transmitted via RRC signaling based on the received nth subframe.

As another example, Table 14 below shows a cross subframe scheduling configuration method using an SIF.

TABLE 14

| SIF bits | Direct mapping method | RRC configured method |
|---|---|---|
| 00 | Non CSS = no delay(or current subframe) (e.g., m = 0) | 1st RRC configured parameter (e.g., number of subframe later(or delay), m = 0 or 1 or 2 or 3) |
| 01 | 1 subframe later(or delay) (e.g., m = 1) | 2nd RRC configured parameter (e.g., number of subframe later(or delay), m = 0 or 1 or 2 or 3) |
| 10 | 2 subframes later(or delay) (e.g., m = 2) | 3rd RRC configured parameter (e.g., number of subframe later(or delay), m = 0 or 1 or 2 or 3) |
| 11 | 3 subframes later(or delay) (e.g., m = 3) | 4th RRC configured parameter (e.g., number of subframe later(or delay), m = 0 or 1 or 2 or 3) |

Referring to Table 14 above, an SIF bit is configured by two bits like in Table 13 above, indicated information may be different according to each SIF bit value in the direct mapping method and the RRC configuration.

4. 3. Use of all Bits of Carrier Indication Field (CIF)

A BS may previously indicate or configure whether a CIF in a DCI format is for cross subframe scheduling or cross cell scheduling via RRC signaling. That is, the UE may pre-receive information regarding whether a CIF in a PDCCH acquired from the BS is used as indication bits for cross subframe scheduling or ServCellIndex for cross cell scheduling via the RRC signaling. Thus, the UE may acquire control channel information regarding scheduling, appropriate for a corresponding objective, using the CFI in the received PDCCH and use all CIF values as indication bits for cross cell scheduling or cross subframe scheduling.

Table 15 below shows a cross subframe scheduling configuration method using all CIF values. Table 15 below shows a case in which cross subframe scheduling is configured via RRC signaling.

TABLE 15

| CIF value | Bit format | Contents option #1 | Contents option #2 |
|---|---|---|---|
| 0 | 000 | 1 subframe later(or delay) (e.g., m = 1) | 0 subframe later(or delay) = no delay(or current subframe) (e.g., m = 0) |
| 1 | 001 | 2 subframes later(or delay) (e.g., m = 2) | 1 subframe later(or delay) (e.g., m = 1) |
| 2 | 010 | 3 subframes later(or delay) (e.g., m = 3) | 2 subframes later(or delay) (e.g., m = 2) |
| 3 | 011 | 4 subframes later(or delay) (e.g., m = 4) | 3 subframes later(or delay) (e.g., m = 3) |
| 4 | 100 | 5 subframes later(or delay) (e.g. m = 5) | 4 subframes later(or delay) (e.g., m = 4) |
| 5 | 101 | 6 subframes later(or delay) (e.g., m = 6) | 5 subframes later(or delay) (e.g., m = 5) |
| 6 | 110 | 7 subframes later(or delay) (e.g., m = 7) | 6 subframes later(or delay) (e.g., m = 6) |
| 7 | 111 | 8 subframes later(or delay) (e.g., m = 8) | 7 subframes later(or delay) (e.g., m = 7) |

Referring to Table 15 above, position and delay information (e.g., m of n+k+m) of a subframe indicated by a corresponding CIF for each respective CIF value may be configured. In this case, as in option #1, only delayed information (e.g., m of n+k+m) based on a subframe for reception of a PDCCH may be configured or alternatively as in option #2, information including non-delayed information (e.g., m of n+k+m, m>=0) may be configured.

Information indicated by each SIF value (or bit) or CIF value (or bit) shown in the aforementioned Tables (Tables 7 to 15) is purely exemplary. Thus, information indicated by the CIF value or SIF value may be changed in various ways. For example, the same CIF value may indicate different information according to a cell or time.

5. Overview of Device According to an Embodiment of the Present Invention

Figure 20:
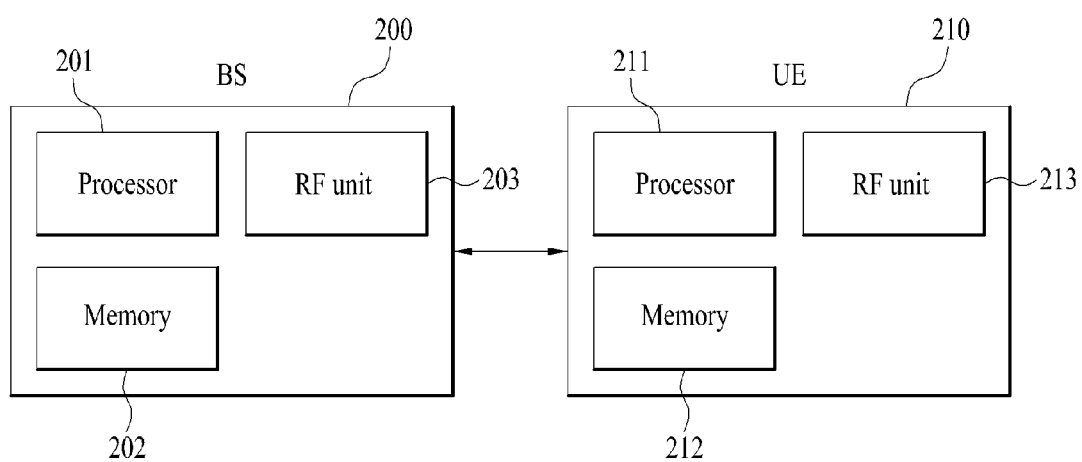
FIG. 20 is a block diagram of a communication device according to an embodiment of the present invention.

FIG. 20 is a block diagram of a communication device according to an embodiment of the present invention.

Referring to FIG. 17, a wireless communication system includes a BS 200 and a plurality of UEs 210 positioned in an area of the BS 200.

The BS 200 includes a processor 201, a memory 202, and a radio frequency (RF) unit 203. The processor 201 embodies the proposed functions, procedures, and/or methods. Layers of a wireless interface protocol may be embodied by the processor 201. The memory 202 is connected to the processor 201 and stores various information for driving the processor 201. The RF unit 203 is connected to the processor 201 and transmits and/or receives a radio signal.

The UE 210 includes a processor 211, a memory 212, and an RF unit 213. The processor 211 embodies the proposed functions, procedures, and/or methods. Layers of a wireless interface protocol may be embodied by the processor 211. The memory 212 is connected to the processor 211 and stores various information for driving the processor 211. The RF unit 213 is connected to the processor 211 and transmits and/or receives a radio signal.

The memories 202 and 212 may be inside or outside the processors 201 and 211 and connected to processors 201 and 211 via various well-known means. In addition, the BS 200 and/or the UE 210 may have a single antenna or a multiple antenna.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to various wireless access systems other than a 3rd generation partnership project (3GPP) long term evolution (LTE) system although the embodiments of the present invention have been described in terms of an example in which a data transmitting/receiving method is applied to the 3GPP LET system.

The invention claimed is:

1. A method of transmitting and receiving data in a wireless access system for supporting carrier aggregation, the method comprising:
   transmitting downlink control information (DCI) for scheduling downlink data on a physical downlink control channel (PDCCH) in a first subframe; and
   transmitting the downlink data scheduled according to the DCI on a physical downlink shared channel (PDSCH) in a second subframe which is not the first subframe,
   wherein the DCI comprises a subframe indicator field (SIF) indicating the second subframe for transmission of the downlink data,
   wherein same bits of the SIF indicate the second subframe differently, for a case when a direct mapping method is applied and for a case when a radio resource control (RRC) configured method is applied, and
   wherein the direct mapping method is a scheme for determining the second subframe by using only the SIF, and the RRC configured method is a scheme for determining the second subframe by referring to a RRC signaling indicating a subframe.

2. The method according to claim 1, wherein, when the direct mapping method is applied, the SIF indicates an interval between the first subframe and the second subframe.

3. The method according to claim 1, wherein, when the direct mapping method is applied, the SIF indicates an index of the second subframe in a radio frame for transmission of the DCI.

4. The method according to claim 1, wherein:
   the SIF further indicates a carrier for transmission of the downlink data; and
   the transmitting of the downlink data comprises transmitting the downlink data in the second subframe of a carrier indicated by the SIF.

5. The method according to claim 1, wherein the transmitting of the downlink data comprises transmitting the downlink data in a carrier for transmission of the DCI.

6. The method according to claim 1, further comprising indicating a carrier for transmission of the downlink data via upper layer signaling.

7. A base station (BS) for transmitting and receiving data in a wireless access system for supporting carrier aggregation, the BS comprising:
    a radio frequency (RF) unit configured to transmit and receive a radio signal; and
    a processor configured to:
        transmit downlink control information (DCI) for scheduling downlink data on a physical downlink control channel (PDCCH) in a first subframe, and
        transmit the downlink data scheduled according to the DCI on a physical downlink shared channel (PDSCH) in a second subframe which is not the first subframe,
    wherein the DCI comprises a subframe indicator field (SIF) indicating the second subframe for transmission of the downlink data,
    wherein same bits of the SIF indicate the second subframe differently, for a case when a direct mapping method is applied and for a case when a radio resource control (RRC) configured method is applied, and
    wherein the direct mapping method is a scheme for determining the second subframe by using only the SIF, and the RRC configured method is a scheme for determining the second subframe by referring to a RRC signaling indicating a subframe.

8. The BS according to claim 7, wherein, when the direct mapping method is applied, the SIF indicates an interval between the first subframe and the second subframe.

9. The BS according to claim 7, wherein, when the direct mapping method is applied, the SIF indicates an index of the second subframe in a radio frame for transmission of the DCI.

10. The BS according to claim 7, wherein:
    the SIF further indicates a carrier for transmission of the downlink data; and
    the processor transmits the downlink data in the second subframe of a carrier indicated by the SIF.

11. The BS according to claim 7, wherein the processor transmits the downlink data in a carrier for transmission of the DCI.

12. The BS according to claim 7, wherein the processor indicates a carrier for transmission of the downlink data via upper layer signaling.

13. A user equipment (UE) for transmitting and receiving data in a wireless access system for supporting carrier aggregation, the UE comprising:
    a radio frequency (RF) unit configured to transmit and receive a radio signal; and
    a processor configured to:
        receive downlink control information (DCI) for scheduling downlink data on a physical downlink control channel (PDCCH) in a first subframe, and
        receive the downlink data scheduled according to the downlink control information on a physical downlink shared channel (PDSCH) in a second subframe which is not the first subframe,
    wherein the DCI comprises a subframe indicator field (SIF) indicating the second subframe for transmission of the downlink data,
    wherein same bits of the SIF indicate the second subframe differently, for a case when a direct mapping method is applied and for a case when a radio resource control (RRC) configured method is applied, and
    wherein the direct mapping method is a scheme for determining the second subframe by using only the SIF, and the RRC configured method is a scheme for determining the second subframe by referring to a RRC signaling indicating a subframe.

14. The UE according to claim 13, wherein, when the direct mapping method is applied, the SIF indicates an interval between the first subframe and the second subframe.

15. The UE according to claim 13, wherein, when the direct mapping method is applied, the SIF indicates an index of the second subframe in a radio frame for transmission of the DCI.

16. The UE according to claim 13, wherein:
    the SIF further indicates a carrier for transmission of the downlink data; and
    the processor receives the downlink data in the second subframe of a carrier indicated by the SIF.

17. The UE according to claim 13, wherein the processor receives the downlink data in a carrier for transmission of the DCI.

18. The UE according to claim 13, wherein the processor receives a carrier for transmission of the downlink data via upper layer signaling.

* * * * *